US011248519B2

(12) United States Patent
Gerges et al.

(10) Patent No.: US 11,248,519 B2
(45) Date of Patent: Feb. 15, 2022

(54) ACTIVE WARM-UP SYSTEM AND METHOD

(71) Applicant: DANA CANADA CORPORATION, Oakville (CA)

(72) Inventors: Ihab Edward Gerges, Oakville (CA); Jeffrey O. Sheppard, Milton (CA)

(73) Assignee: Dana Canada Corporation, Oakville (CA)

( * ) Notice: Subject to any disclaimer, the term of this patent is extended or adjusted under 35 U.S.C. 154(b) by 108 days.

(21) Appl. No.: 16/754,074

(22) PCT Filed: Oct. 4, 2018

(86) PCT No.: PCT/CA2018/051251
§ 371 (c)(1),
(2) Date: Apr. 6, 2020

(87) PCT Pub. No.: WO2019/068192
PCT Pub. Date: Apr. 11, 2019

(65) Prior Publication Data
US 2020/0332702 A1 Oct. 22, 2020

Related U.S. Application Data

(60) Provisional application No. 62/569,389, filed on Oct. 6, 2017.

(51) Int. Cl.
*F01P 7/16* (2006.01)
*B60H 1/00* (2006.01)
(Continued)

(52) U.S. Cl.
CPC .......... *F01P 7/165* (2013.01); *B60H 1/00314* (2013.01); *B60H 1/038* (2013.01);
(Continued)

(58) Field of Classification Search
CPC ........ F01P 7/165; F01P 3/18; F01P 2003/182; F01P 2003/187; F01P 2007/146;
(Continued)

(56) References Cited

U.S. PATENT DOCUMENTS 5,593,088 A 1/1997 Hennrich et al.
6,308,776 B1 10/2001 Sloan et al.
(Continued)

FOREIGN PATENT DOCUMENTS

WO 2014138991 A1 9/2014
WO 2016151040 A1 9/2016

*Primary Examiner* — Jacob M Amick
*Assistant Examiner* — Charles J Brauch
(74) *Attorney, Agent, or Firm* — Ridout & Maybee LLP

(57) ABSTRACT

A vehicle heating/cooling system has first and second fluid circulation loops for circulating engine coolant and automotive fluid. A first heat exchanger transfers heat from the coolant to air for the passenger compartment. A second heat exchanger transfers heat between the coolant and automotive fluid. A first valve has first and second inlets for receiving coolant from hot and cold coolant sources, and an outlet for discharging coolant to the second heat exchanger. A second valve has an inlet for receiving coolant from the first coolant source, and an outlet for discharging coolant to the first inlet of the first valve. The valve positions change with temperature of the coolant and the automotive fluid, providing preferential heating of the passenger compartment during cold start-up of the vehicle. The second heat exchanger and valves may be provided in a temperature control module.

18 Claims, 12 Drawing Sheets

(51) Int. Cl.
  *B60H 1/03* (2006.01)
  *F01P 3/18* (2006.01)
  *F28D 9/00* (2006.01)
  *F01P 7/14* (2006.01)

(52) U.S. Cl.
  CPC ............... *F01P 3/18* (2013.01); *F28D 9/005* (2013.01); *F01P 2003/182* (2013.01); *F01P 2003/187* (2013.01); *F01P 2007/146* (2013.01); *F01P 2007/168* (2013.01); *F01P 2025/08* (2013.01); *F01P 2037/02* (2013.01); *F01P 2060/045* (2013.01); *F01P 2060/08* (2013.01)

(58) Field of Classification Search
  CPC ............. F01P 2007/168; F01P 2025/08; F01P 2037/02; F01P 2060/045; F01P 2060/08; B60H 1/00314; B60H 1/038; B60H 1/03; F28D 9/005; F28D 2021/0089; F28F 27/02; F01M 5/02; B60K 11/02
  See application file for complete search history.

(56) References Cited

U.S. PATENT DOCUMENTS

| | | |
|---|---|---|
| 7,963,119 B2 | 6/2011 | Campbell et al. |
| 8,205,709 B2 | 6/2012 | Gooden et al. |
| 8,631,772 B2 | 1/2014 | Gooden et al. |
| 8,689,617 B2 | 4/2014 | Rollinger et al. |
| 9,217,689 B2 | 12/2015 | Rollinger et al. |
| 9,452,660 B2 | 9/2016 | Sheppard et al. |
| 10,087,793 B2 | 10/2018 | Boyer et al. |
| 2002/0069839 A1 | 6/2002 | Kunze et al. |
| 2009/0101312 A1 | 4/2009 | Gooden et al. |
| 2011/0284309 A1 | 11/2011 | Gooden et al. |
| 2013/0255604 A1 | 10/2013 | Rollinger et al. |
| 2013/0319634 A1* | 12/2013 | Sheppard ................ F28F 27/00 165/96 |
| 2014/0262135 A1* | 9/2014 | Sheppard ................ F01P 7/165 165/42 |
| 2016/0215680 A1 | 7/2016 | Quix |
| 2017/0037770 A1 | 2/2017 | Cook et al. |
| 2018/0274406 A1 | 9/2018 | Dries et al. |

\* cited by examiner

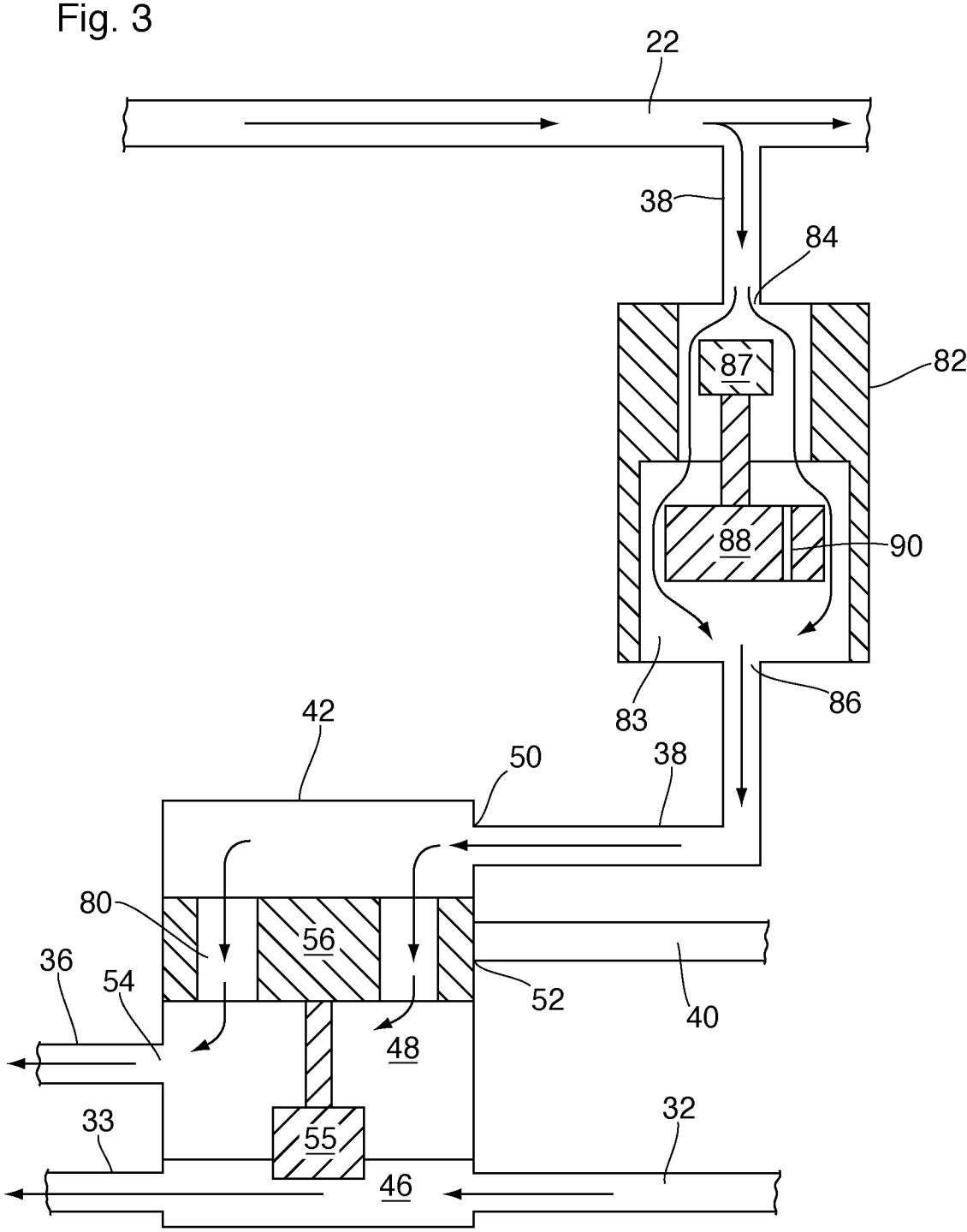

ACTIVE WARM-UP SYSTEM AND METHOD

CROSS-REFERENCE TO RELATED APPLICATION

This application claims priority to and the benefit of U.S. Provisional Patent Application No. 62/569,389 filed Oct. 6, 2017, the contents of which are incorporated herein by reference.

TECHNICAL FIELD

The present disclosure relates to active warm-up (AWU) system configurations for automobiles, which provide warm-up of system components at cold start conditions without delaying cabin warm-up or defrost times, and without delaying engine warming. The AWU systems disclosed herein control the source of a heat exchange fluid that is delivered to a heat exchanger for transferring heat to or from an automotive fluid that is also delivered to the heat exchanger during various start-up conditions while also providing for cabin warm-up and/or defrost functions.

BACKGROUND

It is well understood in the automobile industry that automobiles function most efficiently once all fluids are circulating within the automobile systems at their optimum operating temperatures.

Automotive AWU systems are designed to quickly bring automotive fluids to optimal operating temperatures at start-up, in particular at cold start-up conditions. However, some AWU systems rely on removing heat from the system in an effort to quickly bring fluids to their optimal operating temperature which has an adverse effect on cabin warm-up and/or defrost times, and may also delay engine warming. In cold climate regions where passenger comfort and defrosting functions at cold start conditions are often considered a priority for users of the automobile, removing heat from the system in order to warm automobile fluids at the expense of cabin warm-up and/or defrost can be problematic. Also, delaying engine warming may have a negative impact on overall fuel economy.

Some AWU systems attempt to improve warm-up at cold start conditions without adversely affecting cabin warm-up or defrost times. However, such systems can be costly and can add to the complexity of the installation of the system and often favour either cabin warm-up or fluid warm-up at the expense of the other. In current economic climates where cost effectiveness and robustness of systems/components are valued and often considered a priority, an improved AWU system that aims to decrease the time it takes for key automobile fluids to reach their optimal operating temperature without delaying cabin warm-up and/or defrost times is desirable.

SUMMARY

In accordance with an example embodiment of the present disclosure, there is provided a heating and cooling system for a vehicle having an internal combustion engine, a powertrain component and a passenger compartment, the system comprising: (a) a first fluid circulation loop for circulating an engine coolant, wherein the first fluid circulation loop includes said engine; (b) a second fluid circulation loop for circulating an automotive fluid for lubricating said powertrain component, wherein the second fluid circulation loop includes said powertrain component; (c) a first heat exchanger located downstream of the engine in said engine coolant circulation loop, the first heat exchanger being adapted to receive the engine coolant discharged by the engine and transfer heat from the engine coolant to an air stream provided to the passenger compartment; (d) a second heat exchanger fluidly connected to both the engine coolant circulation loop and the automotive fluid circulation loop and adapted for transferring heat between the engine coolant and the automotive fluid; (e) a first valve provided in the engine coolant circulation loop, the first valve having a first inlet port for receiving said engine coolant from a first coolant source in said engine coolant circulation loop; a second inlet port for receiving said engine coolant from a second coolant source in said engine coolant circulation loop; and an outlet port for discharging said engine coolant to the second heat exchanger; wherein the first valve has a first valve position in which a flow path through the first inlet port and the outlet port is open, and a second valve position in which a flow path through the second inlet port and the outlet port is open; (f) a second valve provided in the engine coolant circulation loop, the second valve having an inlet port for receiving said engine coolant from the first coolant source, and a first outlet port for discharging said engine coolant to the first inlet port of the first valve; wherein the second valve has a first valve position in which a flow path through the inlet port and the first outlet port is partly or completely closed, and a second valve position in which the flow path through the inlet port and the first outlet port is open; and wherein the first coolant source is located intermediate a coolant outlet of the engine through which the engine coolant is discharged, and an inlet of the first heat exchanger.

In accordance with another example embodiment of the present disclosure, there is provided a method of heating and/or cooling an automotive fluid in a vehicle using the heating and cooling system as described herein. The method comprises: (a) in the first operating state of the system with both the first and second valves in their first positions, starting the engine of the vehicle under cold start conditions and circulating the engine coolant through the engine coolant circulation loop, and circulating the automotive fluid through the automotive fluid circulation loop, such that most or all of the engine coolant from the first coolant source flows through the first heat exchanger and transfers heat to said air stream provided to the passenger compartment; (b) as the temperature of the engine coolant discharged by the engine increases, transitioning the second valve from its first valve position to its second valve position and transitioning the system from the first operating state to the second operating state; (c) in the second operating state of the system with the first valve in its first operating position and the second valve in its second operating position, operating the engine under warm-up conditions and circulating the engine coolant through the engine coolant circulation loop, and circulating the automotive fluid through the automotive fluid circulation loop, such that the engine coolant from the first coolant source continues to flow through the first heat exchanger and transfers heat to said air stream provided to the passenger compartment and/or bypasses the first heat exchanger, and such that the engine coolant from the first coolant source flows through the second valve to the first valve, and through the first valve to the second heat exchanger, and transfers heat to the automotive fluid flowing through the second heat exchanger; and (d) as the temperature of the engine coolant discharged by the engine increases to within a normal operating range, transitioning the first valve from its first valve position to its second valve position and transitioning the system from the second operating state to the third operating state; (e) in the third operating state of the system with both the first and second valves in their second operating positions, operating the engine under normal operating conditions and circulating the engine coolant through the engine coolant circulation loop, and circulating the automotive fluid through the automotive fluid circulation loop, such that the engine coolant from the second coolant source flows through the first valve to the second heat exchanger, and extracts heat from the automotive fluid flowing through the second heat exchanger, and such that the such that the engine coolant from the first coolant source continues to flow through the first heat exchanger and transfers heat to said air stream provided to the passenger compartment, and/or bypasses the first heat exchanger.

In accordance with another example embodiment of the present disclosure, there is provided a temperature control module for a vehicle heating and cooling system, wherein the temperature control module comprises: (a) a transmission fluid heat exchanger comprising a stack of core plates defining alternating flow passages for a coolant and for transmission fluid, the heat exchanger having inlet and outlet manifolds for the coolant and the transmission fluid, the manifolds extending throughout the height of the plate stack, the heat exchanger having a top plate with apertures in fluid communication with the manifolds, the manifolds being provided with fittings; (b) a valve assembly comprising a first thermally actuated valve and a second thermally actuated valve, the valve assembly comprising: a control chamber of the first valve being located at a first end of the valve assembly, the control chamber having an inlet for receiving said transmission fluid and an outlet which is sealingly connected to the top plate through an attachment flange, and in fluid communication with a transmission fluid inlet manifold of the heat exchanger; a main valve chamber of the first valve having first and second inlet ports and an outlet port, the outlet port being located at a second end of the valve assembly, with the outlet port being sealingly connected to the top plate through an attachment flange, and in fluid communication with a coolant inlet manifold of the heat exchanger; a coolant inlet fitting for receiving the coolant from a second coolant source being sealingly connected to the first valve at said second inlet port of the main valve chamber; and said second valve having an inlet port for receiving the coolant from a first coolant source, and an outlet port which is sealingly connected to the first valve at said first inlet port of the main valve chamber.

BRIEF DESCRIPTION OF THE DRAWINGS

Exemplary embodiments of the present disclosure will now be described, by way of example, with reference to the accompanying drawings, in which:

FIG. 3 is a schematic diagram showing a portion of the heating/cooling system of FIG. 1 in a second operating state;

DETAILED DESCRIPTION

Figure 1:
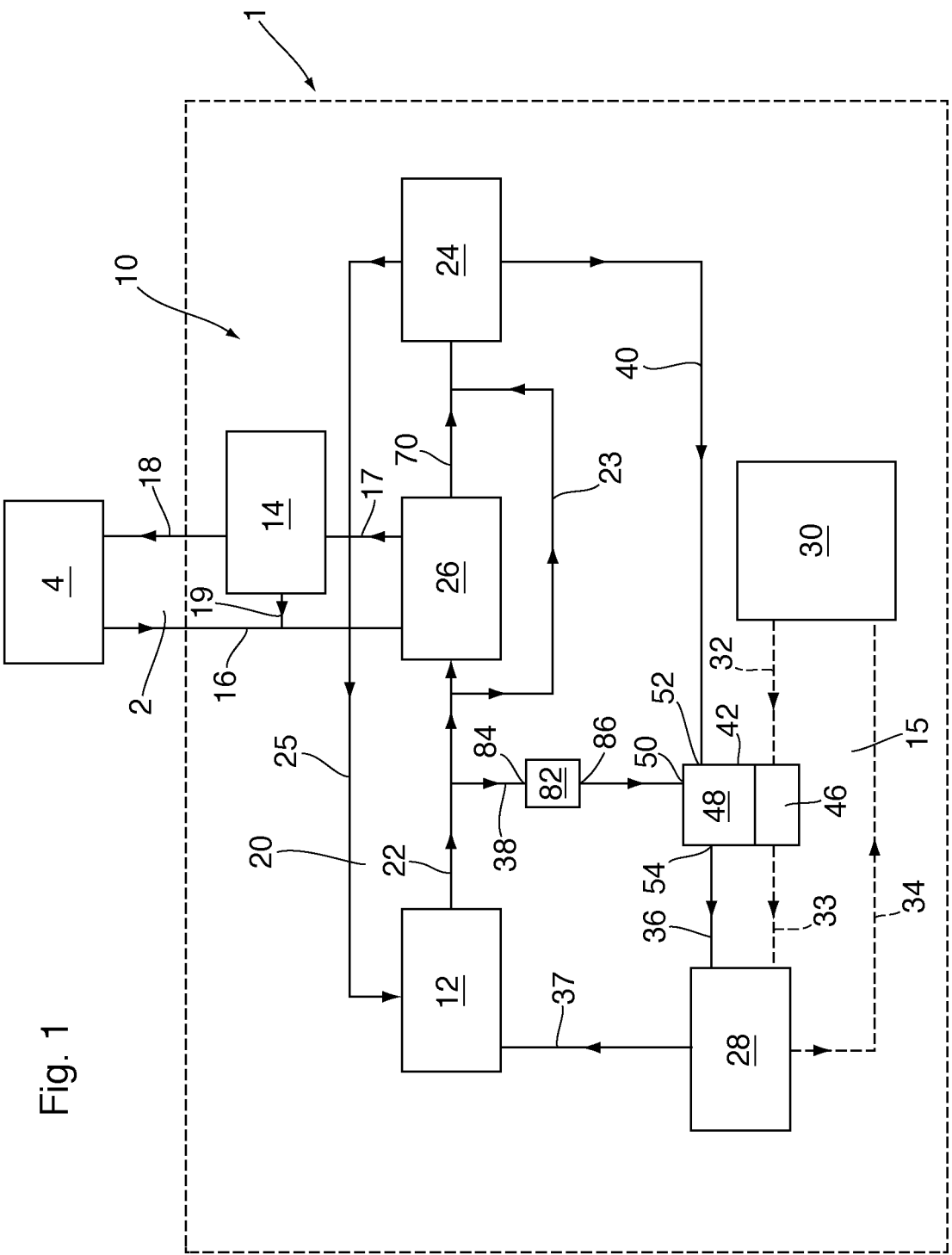
FIG. 1 is a schematic diagram showing a heating/cooling system according to a first embodiment.

The following description relates to various embodiments of a heating/cooling system 10 for a vehicle 1 powered by an internal combustion engine 12 and having a passenger compartment 14 and a powertrain component 30 containing an automotive fluid, such as a lubricant. For example, the powertrain component 30 may comprise the vehicle transmission, in which the automotive fluid is transmission fluid. Alternatively, the powertrain component 30 may comprise an axle, in which case the automotive fluid is axle fluid. One or more heat exchange fluids are circulated through the heating/cooling system for heating and/or cooling various vehicle components. For example, the heat exchange fluids are selected from one or more of engine coolant, air, water, and refrigerants.

In the specific embodiments described below, the powertrain component 30 is the vehicle transmission and the automotive fluid is therefore transmission fluid. Also, all the embodiments described below include engine coolant as the heat exchange fluid.

FIG. 1 schematically shows a heating/cooling system 10 according to a first embodiment, for a vehicle 1 powered by an internal combustion engine 12 and having a transmission 30. System 10 includes a first fluid circulation loop 20 (solid lines) through which engine coolant is circulated, and a second fluid circulation loop 15 (dashed lines) through which transmission fluid is circulated. There is no mixing of fluids between the first and second loops 20, 15. System 10 also includes a third fluid circulation loop 2 (solid lines) through which air is circulated.

The engine coolant is circulated through the first loop 20 through a plurality of coolant conduits, which are labeled 22, 23, 25, 36, 37, 38, 40, 70, and the transmission fluid is circulated through the second loop 15 through a plurality of transmission fluid conduits 32, 33 and 34. Air is circulated in system 10, and/or between system 10 and the atmosphere 4, through air conduits 16, 17, 18 and 19.

System 10 includes a first heat exchanger 26 which is adapted to receive an incoming air stream through air conduit 16, such as ambient atmospheric air from atmosphere 4 and/or a re-circulated air stream from passenger compartment 14 through air conduit 19, and a liquid stream comprising hot engine coolant discharged from the engine 12 through coolant conduit 22. The air and the coolant are passed through the first heat exchanger 26 and heat is transferred from the coolant to the air. The heated air stream produced by heat exchanger 26 is then blown into the passenger compartment 14 as a heated air stream through air conduit 17, to heat and/or defrost the passenger compartment 14 while the heat-depleted coolant is discharged from the first heat exchanger 26 through coolant conduit 70. The first heat exchanger 26 is sometimes referred to herein as a "heater core". As shown in FIG. 1, used air is discharged from passenger compartment 14 as exhaust air stream through air conduit 18, and is returned to the atmosphere 4, and/or is re-circulated through air conduit 19 and returned to the first heat exchanger 26.

System 10 also includes a second heat exchanger 28 which is adapted to receive the transmission fluid circulating in second loop 15, and to receive engine coolant circulating in the first loop 20. In particular, the second heat exchanger 28 is a liquid/liquid heat exchanger which is adapted to receive transmission fluid discharged from the transmission 30 through transmission fluid conduits 32 and 33, and to discharge the transmission fluid back toward the transmission 30 through transmission fluid conduit 34. Second heat exchanger 28 is also adapted to receive engine coolant through coolant conduit 36 and to discharge the coolant toward the engine 12 through coolant conduit 37. The coolant and the transmission fluid are passed through the second heat exchanger 26 and heat is transferred from the coolant to the transmission fluid, or vice versa, depending on the operating mode of the system 10. The second heat exchanger 26 is sometimes referred to herein as transmission oil warmer (TOW) or transmission oil cooler (TOC).

System 10 also includes a third heat exchanger 24 which receives engine coolant from the first heat exchanger 26 through coolant conduit 70, or directly from the engine 12 through bypass coolant conduit 23. The third heat exchanger 24 cools the coolant and then discharges it through coolant conduit 25, to engine 12 through conduit 25, and/or through coolant conduit 40 in the direction of the second heat exchanger 28. In the illustrated embodiment the coolant conduit 40 is shown as a branch of conduit 25, although any arrangement of conduits which permits coolant to flow from the third heat exchanger 24 to one or both of the engine 12 and the second heat exchanger 28 is within the scope of the present disclosure. The third heat exchanger 24 is typically a gas/liquid heat exchanger such as a fan-cooled radiator and uses ambient air to remove heat from the coolant.

Depending upon the operating conditions of vehicle 1, system 10 supplies the second heat exchanger 28 with a coolant stream at a temperature such that heat will either be transferred to or removed from the transmission fluid flowing through the heat exchanger 28. More specifically, second heat exchanger 28 can be supplied with coolant from one or both of a "first coolant source" and a "second coolant source". The first coolant source comprises a flow of coolant from a location between the engine 12 and the first heat exchanger 26, such as coolant conduit 38 which receives engine coolant directly from the engine 12 and branches off from the coolant conduit 22 upstream of the first heat exchanger 26. The second coolant source comprises a flow of coolant from a location downstream of the first heat exchanger 26, and optionally downstream of the third heat exchanger 24, such as coolant conduit 40 carrying coolant discharged by the third heat exchanger 24. The first coolant source is generally considered to be a hot or warm coolant source, having been heated and discharged by the engine, while the second coolant source is generally considered a cold or cool coolant source, having been cooled and discharged by the first heat exchanger 26 and optionally by the third heat exchanger (or radiator) 24. In general, under most operating conditions the temperature of the coolant in conduit 38 is higher than the temperature of the coolant in conduit 40. Therefore, in the present description, the coolant in conduit 38 is generally referred to "hot coolant" while the coolant in conduit 40 is generally referred to as "cold coolant". However, it will be appreciated that under certain conditions, such as under cold start conditions, the coolant in conduits 38, 40 may be neither hot nor cold, and may be at ambient temperatures at initial start-up of the engine. In the present embodiment the hot and cold coolant streams both comprise engine coolant circulating within the same circulation loop 20. However, as further discussed below, the cold coolant source may comprise a separate circulation loop containing the same or different coolant. For example, the cold coolant source may comprise a refrigerant-cooled fluid circulation loop through which a chilled coolant is circulated.

The system 10 further comprises a first valve 42 and a second valve 82 for controlling the flow of engine coolant within the system 10, as now described with reference to FIGS. 1-4. The particular arrangement of valves 42, 82 shown in FIGS. 1-4 allows for active warm-up of the transmission fluid at cold start conditions without delaying cabin warm-up and/or defrosting since most or all of the coolant discharged by the engine 12 through coolant conduit 22 will initially flow through the first heat exchanger 26 (heater core for cabin heating), until the cabin is heated and/or defrosted and/or the coolant reaches a sufficiently high temperature, as will be described in further detail below.

The first valve 42 controls the source of the engine coolant supplied to the second heat exchanger 28, based on the temperature of a control fluid. First valve 42 is a two-chamber control valve having a first valve chamber 46 for sensing the temperature of the control fluid, wherein the control fluid is the transmission fluid discharged by the transmission 30 through transmission fluid conduit 32. The first valve chamber 46 is also referred to herein as the "control chamber". The transmission fluid is continuously circulated through the first valve chamber 46 throughout all operating states of the system 10.

The second valve chamber 48 is a three-port valve chamber and serves to direct coolant from one or both of the first (hot) coolant source 38 and the second (cold) coolant source 40 to the second heat exchanger 28 through transmission fluid conduit 36. Second valve chamber 48 has a first inlet port 50 fluidly coupled to hot coolant source 38 and a second inlet port 52 fluidly coupled to the cold coolant source 40. Valve chamber 48 is also provided with outlet port 54 which is fluidly coupled to the coolant conduit 36 through which the coolant is discharged from the second valve chamber 48 and delivered to the second heat exchanger 28. First valve chamber 46 and second valve chamber 48 are fluidly isolated from each other in that fluid entering/exiting the first valve chamber 46 does not mix with or come into contact with the fluid entering/exiting the second valve chamber 48.

Figure 2:
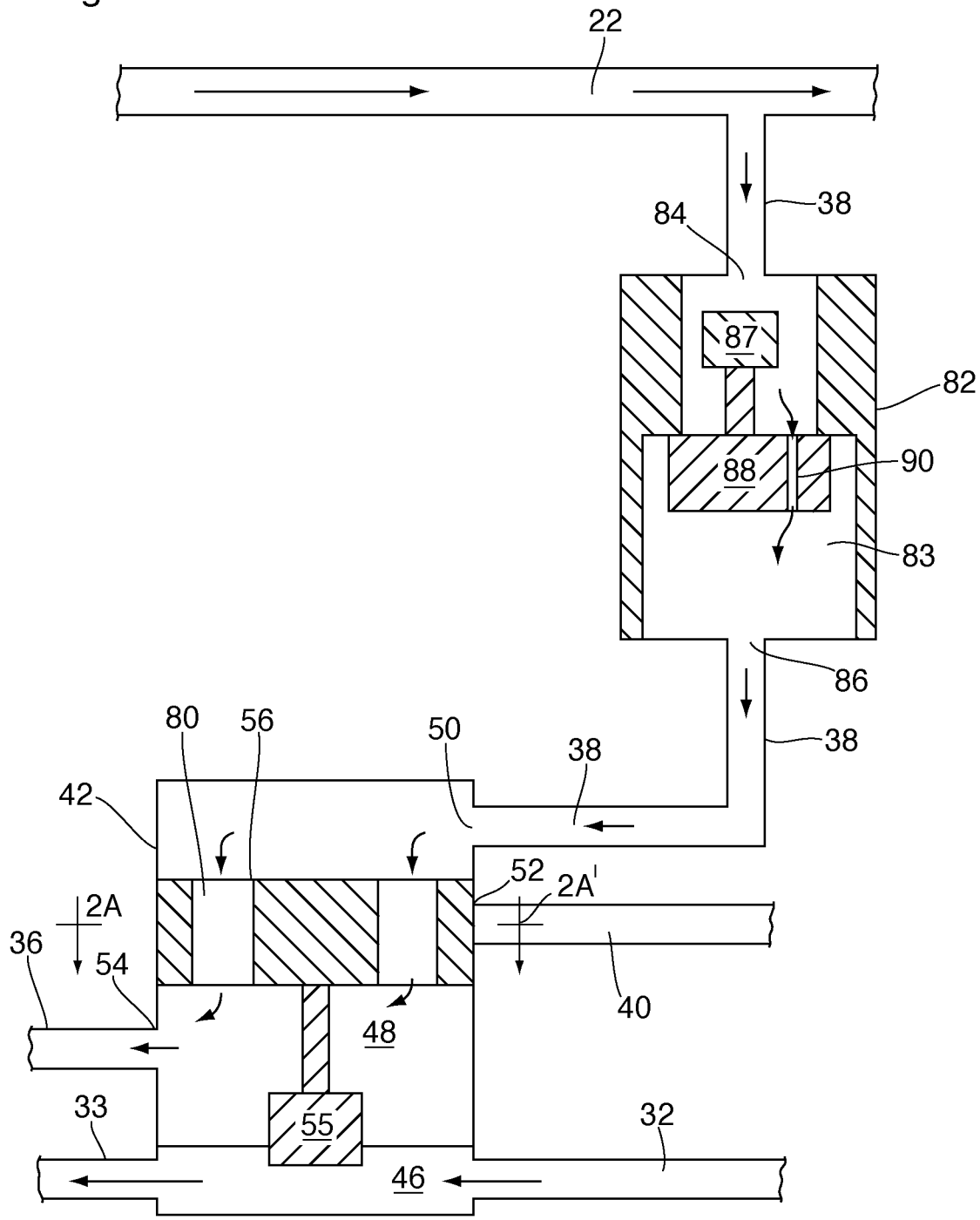
FIG. 2 is a schematic diagram showing a portion of the heating/cooling system of FIG. 1 in a first operating state.
Figure 4:
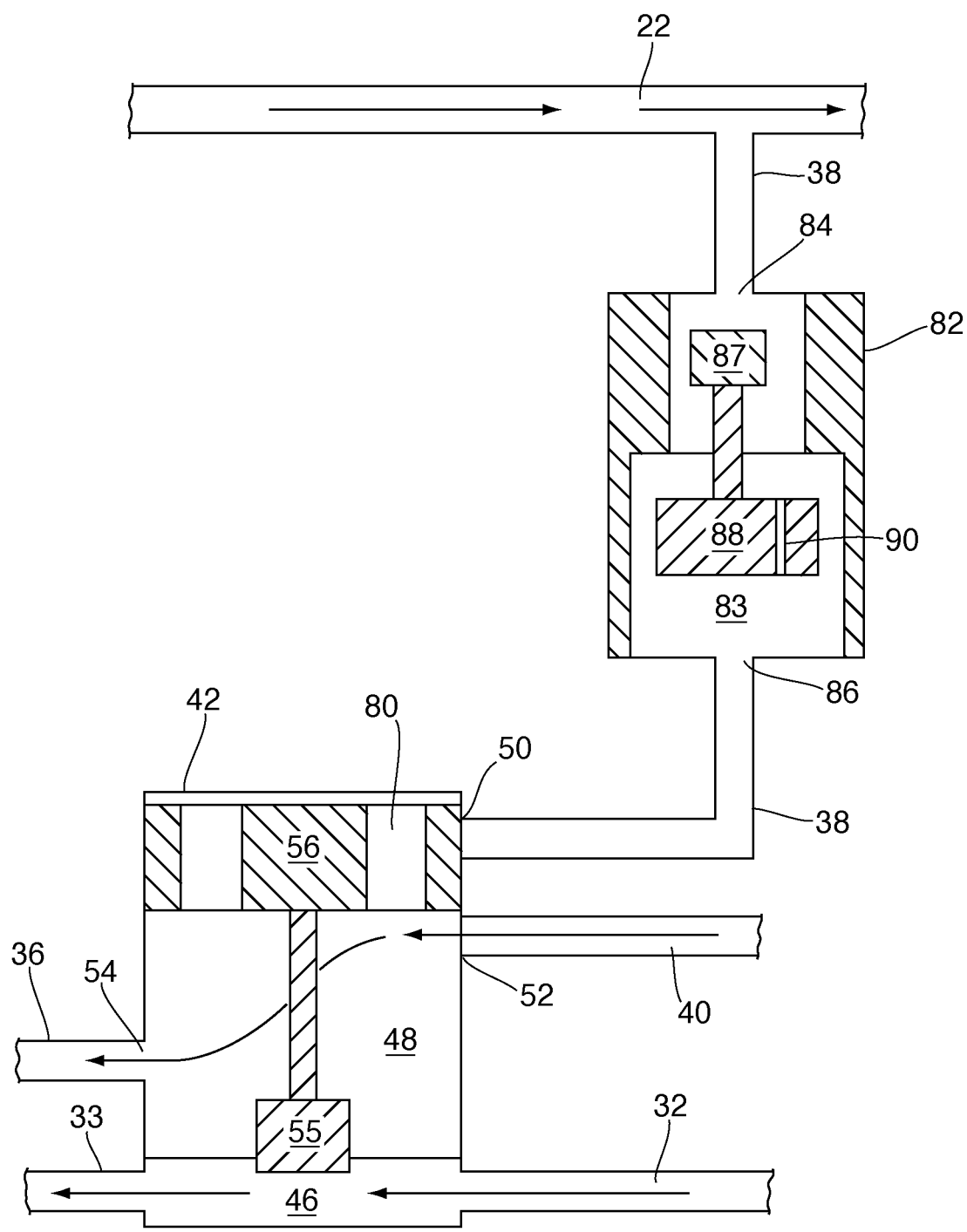
FIG. 4 is a schematic diagram showing a portion of the heating/cooling system of FIG. 1 in a third operating state.

As schematically shown in FIGS. 2-4, a thermal actuator 55 is at least partially disposed within the first valve chamber 46 for contact with the transmission fluid flowing through the first valve chamber 46. As is known in the art, the thermal actuator 55 includes an actuator piston movable from a first position to a second position by means of expansion/contraction of a thermal modulation device contained in the thermal actuator 55. The thermal modulation device expands/contracts in response to the temperature of the transmission fluid flowing through valve chamber 46. While reference is made to a thermal actuator 55 having a thermal modulation device in the form of a wax motor, it will be understood that any suitable thermal actuator incorporating a thermal modulation device as known in the art may be used.

A valve mechanism 56, such as a valve disk or spool valve mechanism, is disposed within the second valve chamber 48 for controlling the flow of the coolant entering the second valve chamber 48 of first valve 42. The valve mechanism 56 is operatively coupled to the thermal actuator 55 through the piston and is moveable from a first valve position to a second valve position upon actuation by the thermal actuator 55, as further described below.

Second valve 82 is a two-port thermal mechanical valve which is in fluid communication with the first coolant source, i.e. the coolant flowing through hot coolant conduit 38, downstream of the engine 12 and upstream of both the first heat exchanger 26 and the first valve 42, so as to receive hot coolant from the engine 12 and control flow of the hot coolant through coolant conduit 38 to the first valve 42. In schematic FIGS. 1-4 the first and second valves 42, 82 are shown as being physically separated from one another and from second heat exchanger 28, with second valve 82 being located in coolant conduit 38 upstream of the first valve 42. However, it will be appreciated that the valves 42, 82 are not necessarily physically separated from one another or from second heat exchanger 28, but may be integrated into a single unit or module, as further discussed below.

The function of the second valve 82 is to delay the drawing of thermal energy for active warm-up purposes during the initial phase of cold start-up of engine 12 so as to prioritize cabin heating over active warm-up, and to prevent the AWU system from delaying engine warming, which may have a negative impact on overall fuel economy.

Second valve 82 has a valve chamber 83, an inlet port 84 in fluid communication with the coolant outlet port of engine 12 and/or the coolant conduit 22, and an outlet port 86 in fluid communication with the first inlet port 50 of second valve 42. A thermal actuator 87 is disposed within valve chamber 83, the thermal actuator 87 comprising a thermal modulation device for controlling an actuator piston and a valve mechanism 88, the valve mechanism 88 moving from a first, closed position to a second, open position based on the temperature of the fluid entering valve chamber 83 through inlet port 84.

The heating/cooling system 10 has three operating states, which are shown in FIGS. 2, 3 and 4 and now discussed below. In the present embodiment, it is assumed that the typical temperature range of transmission fluid in an automobile system is generally in the range of about −30 to 170° C., with the optimal operating temperature range being in the range of about 50 to 100° C.

FIG. 2 shows the positions of valves 42, 82 in a first operating state of the system 10, also referred to herein as cold start-up. This operating state exists at initial start-up of engine 12 under cold conditions. Under these conditions, the passenger compartment 14 may require heating and/or defrosting, and the first operating state of system 10 is configured to prioritize cabin warm-up and/or defrost functions in the passenger compartment 14 of vehicle 1. Under initial cold start-up conditions, both the first valve 42 and the second valve 82 are in their first valve positions, shown in FIG. 2.

Figure 2A:
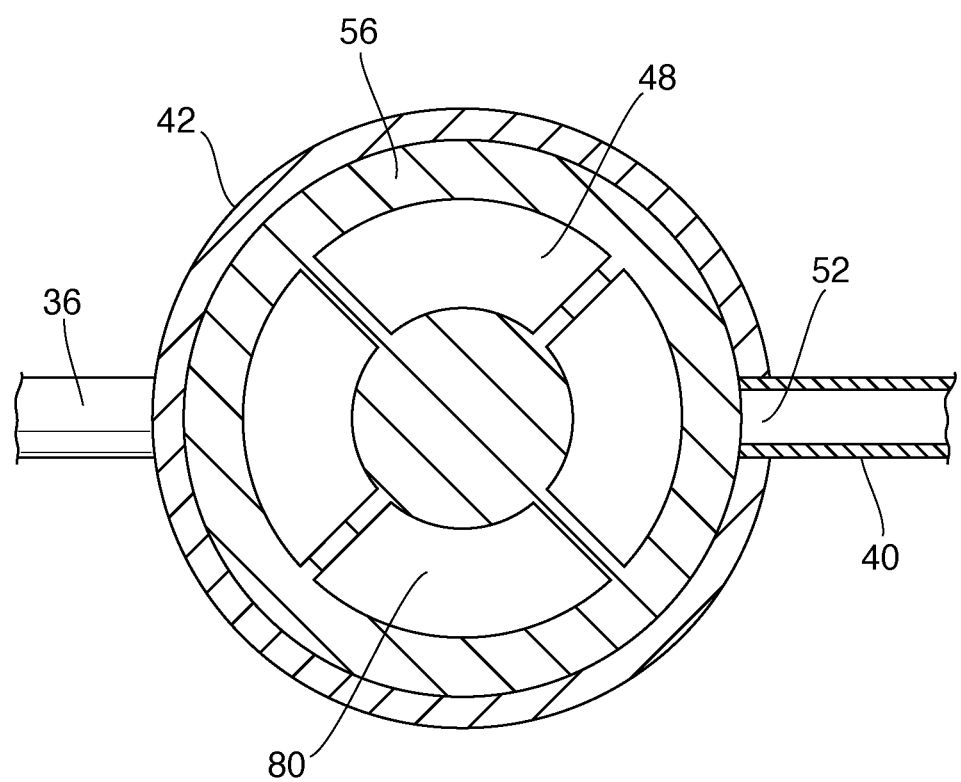
FIG. 2A is a cross-section along line 2A-2A' of FIG. 2.

In the first operating state of system 10, the temperature of the transmission fluid flowing through the first valve chamber 46 is low, and may be at or near ambient temperature. Under these temperature conditions, the thermal modulation device in the thermal actuator 55 and the actuator piston remain in their contracted states and the valve mechanism 56 adopts the first valve position shown in FIG. 2. In the first valve position, valve mechanism 56 blocks the second inlet port 52, preventing coolant from entering the second valve chamber 48 through second inlet port 52 and coolant conduit 40 (i.e. from the second or cold coolant source), while leaving the first inlet port 50 at least partially open to the second valve chamber 48 through a radial flow passage 80 of valve mechanism 56 (FIG. 2A), such that the second valve chamber 48 is in fluid communication with coolant conduit 38 (first or hot coolant source) through the first inlet port 50.

The first position of the second valve 82 corresponds to its closed position, with the thermal actuator 87 and the actuator piston in their contracted state and the valve mechanism 88 blocking most or all of the fluid flow through the valve chamber 83 from inlet port 84 to outlet port 86. For example, in FIG. 2 the valve mechanism 88 is seated on a valve seat. Thus, most or all of the hot coolant from engine 12 is prevented from flowing through coolant conduit 38 to the first inlet port 50 of first valve 42.

In the first operating state of system 10, with the first and second valves 42, 82 in their first positions, most or all of the coolant discharged by engine 12 will flow through coolant line 22 to the first heat exchanger 26 to provide cabin heating and/or defrosting, and little or no coolant flows through the second heat exchanger 28 due to the closed first position of second valve 82. Therefore, in the first operating state, little or no heat is transferred to the transmission fluid flowing through the second heat exchanger 28. In this way, the heating/cooling system 10 according to the present embodiment permits cabin warm-up and defrost functions to be prioritized over active warm-up under cold start conditions. Typically, the system will remain in the first operating state during the initial stages of cold start-up, where the temperature of the coolant discharged by the engine 12 remains below a low temperature threshold temperature, typically in the range of about 35° C. to 45° C., for example about 40° C.

In some embodiments, there may be a minor amount of coolant leakage though the second valve 82 in its first, closed position, and the second valve 82 may be designed to provide a pre-defined amount of fluid flow, which may also referred to herein as "leakage" because it typically represents a minor amount of the total coolant flow through system 10. For example, as shown in FIGS. 2-4, a leak path 90 may be provided through the valve mechanism 88 of second valve 82. Allowing a small amount of fluid leakage through the closed second valve 82 will permit a limited amount of hot coolant flow through coolant conduit 38, into the inlet port 84 of second valve 82, passing through second leak path 90 and through the valve chamber 83 to the outlet port 86, through conduit 38 and into the open first inlet port 50 of first valve 42, through the radial flow passage 80 and through the second valve chamber 48 and outlet port 54, and then through the coolant conduit 36 to second heat exchanger 28, where the hot coolant transfers heat to the cold transmission fluid from transmission 30. In this way, limited leakage of hot coolant through the closed second valve 82 ensures that cabin heating/defrost functions will be prioritized over AWU, but the hot coolant will effectively prime the AWU system by providing a limited amount of transmission fluid warming. Also, leakage is beneficial where the second valve 82 is thermally actuated, as it ensures that the thermal actuator 87 will be maintained in contact with the stream of coolant discharged by the engine 12. It will be appreciated that leak path 90 may be formed in various ways, and may comprise one or more bores which define flow paths through valve mechanism 88.

In operation, the amount of leakage of hot coolant through the closed second valve 82 will typically be no more than about 10 percent of the maximum coolant flow through coolant conduit 38, more typically about 5 percent. It will be appreciated that a major portion of the coolant exiting engine 12 and flowing through coolant conduit 22 will typically flow to the first heat exchanger 26 under all operating conditions described herein, and a minor portion of the coolant from engine 12 will be diverted into coolant conduit 38. The major and minor portions of coolant will vary somewhat from one application to another. In the first operating state illustrated in FIG. 2, the volume of flow through the leak path 90 represents a very small proportion of the total coolant flow exiting engine 12 through coolant conduit 22. For example, in the first operating state, the volume of coolant flow from engine 12 to first heat exchanger 26 may represent greater than about 99% by volume, for example about 99.5% by volume, of the total coolant flow exiting engine 12 through coolant conduit 22, whereas the volume of leak flow through leak path 90 in the first operating state may represent less than about 1% by volume, for example about 0.5% by volume, of the total coolant flow exiting engine 12 through coolant conduit 22. Therefore, in a typical application, the amount of hot coolant from engine 12 which reaches second heat exchanger 28 in the first operating state will typically represent less than about 1% by volume of the total volume of coolant flow exiting engine 12 through coolant conduit 12, for example about 0.5% by volume. However, it will be appreciated that the amount of leakage through second valve 82 may vary from one application to another.

As the temperature of the coolant discharged by the engine 12 and/or leaking through the second valve 82 increases during the cold start-up phase, the system 10 will move from the first operating state to the second operating state shown in FIG. 3, also referred to herein as warm-up. At the transition between the first and second operating states of system 10, the temperature of the coolant circulating through loop 20 increases and the passenger compartment 14 has been at least partially heated and/or defrosted by the heated air produced by heat transfer from the coolant in the first heat exchanger 26, and some limited warming of the transmission fluid may have taken place due to leakage of coolant through second valve 82. As the temperature of the coolant reaches a predetermined low threshold temperature optimized for the operating condition of the vehicle, for example from about 35° C. to 45° C., for example about 40° C., the predetermined low threshold temperature being indicative of a certain degree of cabin warm-up and/or defrost during the cold start-up period, the thermal modulation device in the thermal actuator 87 of second valve 82 expands, causing the actuator piston to move the valve mechanism 88 from the first valve position to the second valve position, shown schematically in FIG. 3. As it moves between the first and second valve positions, the valve mechanism 88 moves away from its first (e.g. seated) position to allow a greater amount of the coolant discharged by engine 12 to flow through the valve chamber 83. In the second operating state of system 10, the first valve 42 remains in its first position, i.e the same position as in FIG. 1, such that the heated coolant from the first coolant source, discharged by engine 12 and flowing through open second valve 82, flows through coolant conduit 38 to the first inlet port 50 of first valve 42, through the radial flow passage 80 and second valve chamber 48 of first valve 42, through the outlet port 54 and coolant conduit 38 to the second heat exchanger 28, to warm the transmission fluid as it flows through second heat exchanger 28.

In the second operating state, the coolant discharged by engine 12 is also permitted to flow to the first heat exchanger 26. Therefore, after the second valve 82 opens, the active warm-up and cabin heating/defrost functions continue operating as needed, at least until the vehicle reaches normal operating temperature. However, because second valve 82 is open in the second operating state, the volume of coolant flow through coolant conduit 38 and second valve 82 is greater in the second operating state than in the first operating state. For example, with the second valve 82 in the open position as shown in FIG. 3, the volume of coolant flow from engine 12 to first heat exchanger 26 may represent about 85-90% by volume of the total coolant flow exiting engine 12 through coolant conduit 22, whereas the volume of flow through open second valve 82 in the second operating state may represent about 10-15% by volume of the total coolant flow exiting engine 12 through coolant conduit 22. Therefore, in a typical application, the amount of hot coolant from engine 12 which reaches second heat exchanger 28 in the second operating state will typically represent about 10-15% by volume of the total volume of coolant flow exiting engine 12 through coolant conduit 12.

Once the transmission fluid reaches or exceeds its normal operating temperature, the system 10 will adopt the third operating state shown in FIG. 4, also referred to herein as normal operation. Typically the transition from the second operating state to the third operating state will occur when the transmission fluid reaches a temperature of about 70-75° C. In the third operating state of system 10, the first valve 42 will adopt its second valve position as described below, and the second valve 82 will remain in its second valve position.

As the transmission fluid reaches the normal operating temperature, the thermal modulation device in the thermal actuator 55 of the first valve 42 expands, causing the actuator piston to move the valve mechanism 56 from the first valve position to the second valve position, shown schematically in FIG. 4. As it moves between the first and second valve positions, the valve mechanism 56 moves out of blocking relation with the second inlet port 52 and moves into blocking relation with the first inlet port 50. Once the valve mechanism 56 reaches the second position, the second inlet port 52 is open and the first inlet port 50 is closed. Thus, the hot coolant from the first coolant source flowing through conduit 38 is prevented from entering second valve chamber 48 through first inlet port 50, while the cold coolant from the second coolant source flowing through conduit 40 is permitted to enter the second valve chamber 48 through second inlet port 52. As in the first valve position, the coolant is then discharged from second valve chamber 48 through outlet port 54 and enters the coolant conduit 36 leading to the second heat exchanger 28. The second valve position is a high temperature configuration which exists once the transmission fluid reaches or exceeds its normal operating temperature and is typically at a higher temperature than the cold coolant in conduit 40, which has been cooled in the first heat exchanger 26 and/or the third heat exchanger (e.g. radiator) 24. Under these conditions, the coolant will extract heat from the transmission fluid in the second heat exchanger 28, so as to maintain the temperature of the coolant within a desired operating temperature range.

The system 10 will typically remain in the third operating state throughout normal operation of the vehicle 1. Also, during normal operation, the requirement for cabin heating and/or defrosting may cease or at least be reduced. Under these conditions, some or all of the hot coolant discharged by engine 12 may be diverted away from the first heat exchanger 26 and directed to the third heat exchanger 24 through a bypass coolant conduit 23. The branch point between coolant conduit 22 and bypass conduit 23 is located downstream of the branch point between coolant conduit 22 and coolant conduit 38, and upstream of the first heat exchanger 26.

The bypass circuit may include a two-port thermal mechanical bypass valve (not shown) in the bypass conduit 23, similar to the second valve 82, or a three-port thermally actuated bypass valve (not shown) at the branch point between coolant conduit 22 and bypass conduit 23. The bypass valve will have a first, low temperature configuration in which coolant flow from engine 12 to first heat exchanger 26 is open and coolant flow through the bypass conduit 23 is partially or completely blocked; and a second, high temperature configuration in which coolant flow through the bypass conduit 23 is open and coolant flow to first heat exchanger 26 is partially or completely blocked.

Figure 5:
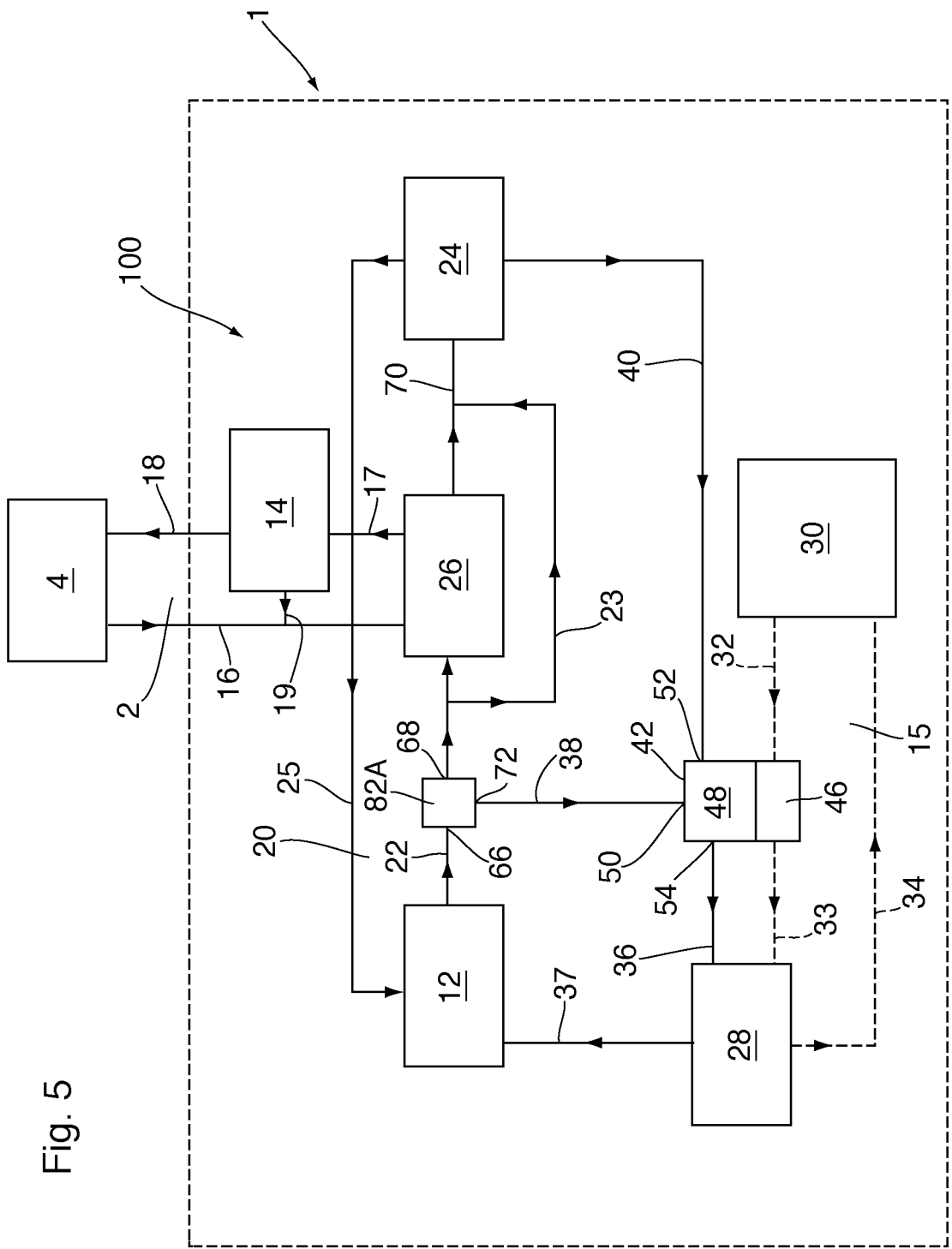
FIG. 5 is a schematic diagram showing a heating/cooling system according to a second embodiment.
Figure 6:
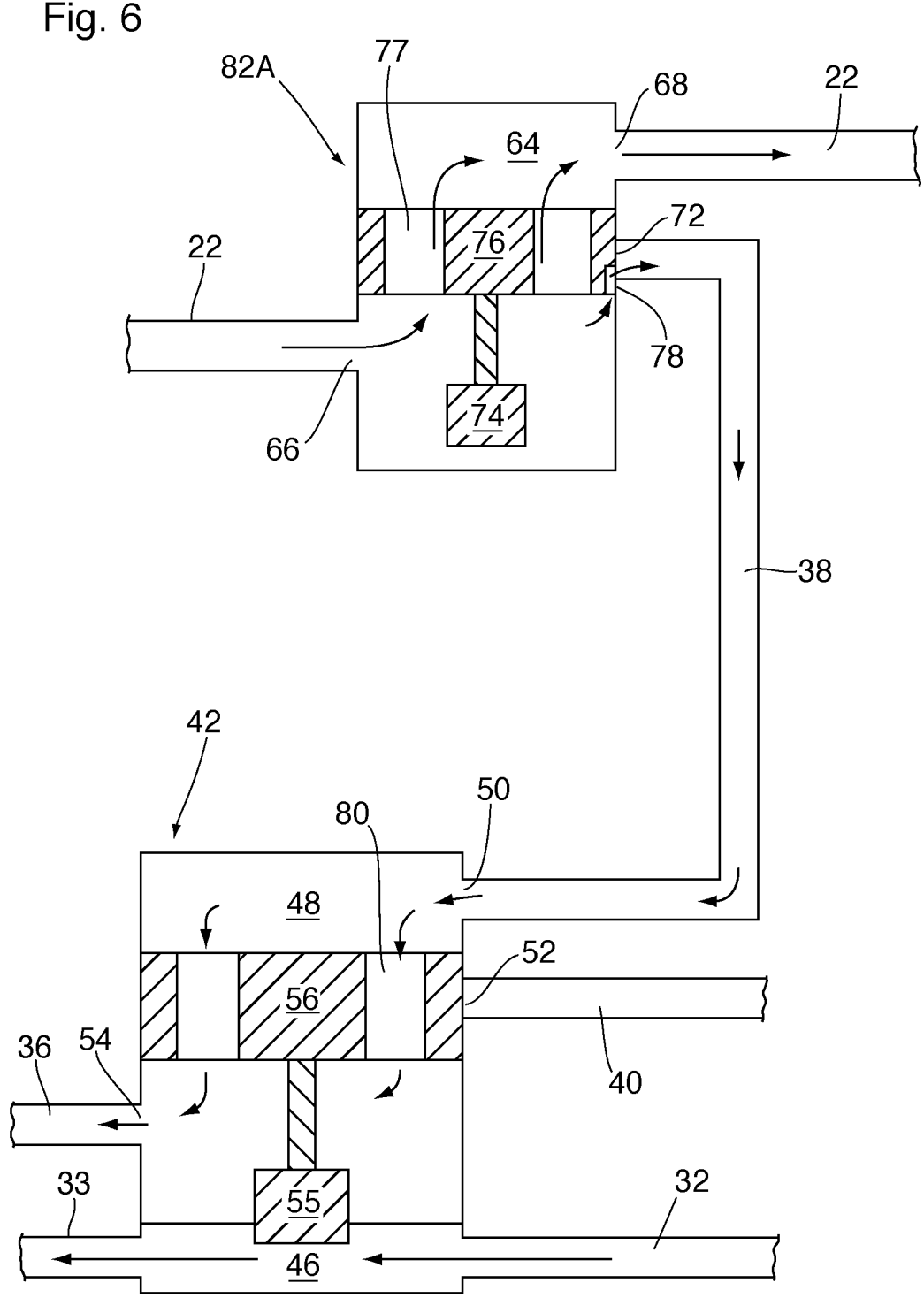
FIG. 6 is a schematic diagram showing a portion of the heating/cooling system of FIG. 5 in a first operating state.
Figure 7:
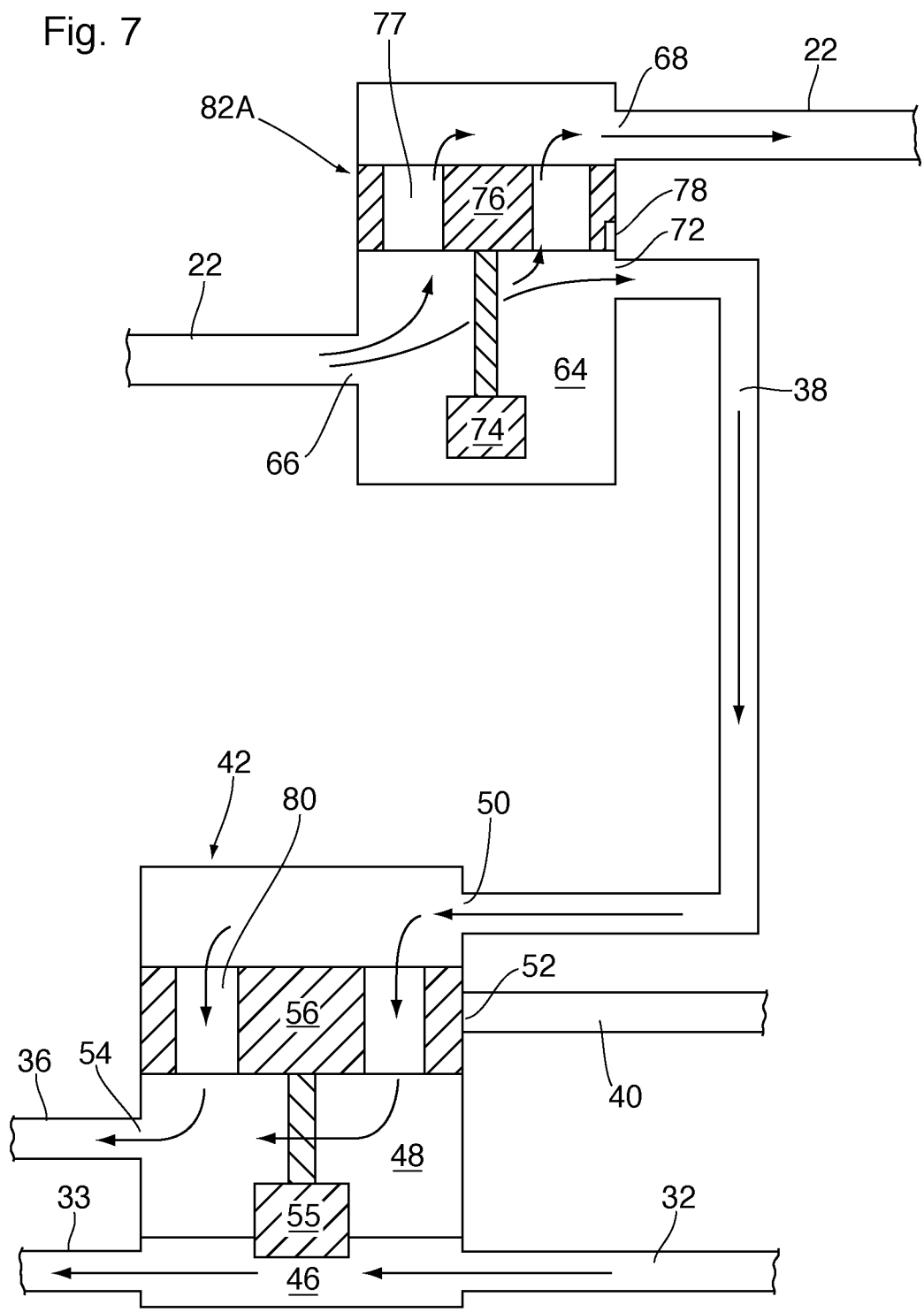
FIG. 7 is a schematic diagram showing a portion of the heating/cooling system of FIG. 5 in a second operating state.

FIGS. 5-7 schematically show a heating/cooling system 100 according to a second embodiment. System 100 includes a number of elements in common with system 10 described above. Like elements of systems 10 and 100 are identified with like reference numerals, and the description of these elements in relation to system 10 applies equally to system 100, except where noted below.

System 100 differs from system 10 in that the two-port second valve 82 of system 10 is replaced by a three-port second valve 82A which is positioned at the branch point between coolant conduit 22, which is the coolant outlet conduit of engine 12, and the coolant conduit 38, which communicates with the first inlet port 50 of first valve 42.

As shown in FIGS. 6 and 7, second valve 82A has an internal valve chamber 64 formed therein and is provided with an inlet port 66 fluidly coupled to the hot coolant outlet of engine 12 through coolant conduit 22, a first outlet port 68 fluidly coupled to the inlet of heat exchanger 26 and the coolant bypass conduit 23 through coolant conduit 22, and a second outlet port 72 which is fluidly coupled to the first inlet port 50 of first valve 42 through coolant conduit 38.

The second valve 82A may be thermally actuated, having a thermal actuator 74 and valve mechanism 76 disposed within valve chamber 64 for controlling the flow of fluid through valve 82A. As described above, the thermal actuator 74 incorporates a thermal modulation device and an actuator piston for moving the valve mechanism 76 from a first valve position to a second valve position as the temperature of the fluid flowing through valve chamber 64 (i.e. the engine coolant exiting the engine 12) increases. As with system 10, the second valve 82A of system 100 is in the first valve position when the system 100 is in the first operating state, in which cabin heating and/or defrosting is prioritized. The first operating state of system 100 is illustrated in FIG. 6. The second valve 82A is in its second valve position when the system 100 is in the second and third operating states. The second operating state of system 100 is illustrated in FIG. 7.

In the first valve position of second valve 82A, the inlet port 66 is open, the first outlet port 68 is open, and the second outlet port 72 is partly or completely closed. This first position of valve 44 forces the engine coolant exiting the engine 12 through coolant conduit 22 to flow through first heat exchanger 26 while partly or completely blocking flow through coolant conduit 38 to the first valve 42. The valve mechanism 76 includes a radial flow path 77 which may be similar to radial flow path 80 of first valve 42 of system 10. According to this arrangement, a major portion of the coolant exiting engine 12 through coolant conduit 22 will flow through the radial flow path 77 of valve mechanism 76 and valve chamber 64 from inlet port 66 to first outlet port 68.

As with valve mechanism 88 described above, valve mechanism 76 may include a leak path 78 through which a predetermined amount of coolant may be discharged from valve chamber 64 through the second outlet port 72, thereby permitting a minor portion of hot coolant flow from the engine 12 to enter coolant conduit 38, through the second valve chamber 48 and radial flow path 80 of first valve 42, to the second heat exchanger 28, as described above with reference to system 10. The major and minor amounts of coolant flow in the first operating state of system 100 may be the same as or similar those described above in system 10. However, it will be appreciated that the amount of leakage may vary from one application to another.

As the temperature of engine coolant exiting engine 12 increases, the thermal modulation device in the thermal actuator 74 of second valve 82A expands, causing the actuator piston to move the valve mechanism 76 from the first valve position to the second valve position, shown schematically in FIG. 7. In this regard, the valve mechanism 76 of second valve 82A moves out of blocking relation with the second outlet port 72, while the inlet port 66 and the first outlet port 68 remain open. With second valve 82A in the second valve position, some engine coolant will continue to flow through the radial flow path 77 of first valve 26, such that a greater portion of the coolant from the first coolant source in coolant conduit 22 will be directed by second valve 82A to the first inlet port 50 of the first valve 42 in the second operating state, as opposed to the first operating state.

In the second operating state of system 100, the first inlet port 50 of first valve 42 is open, permitting the hot coolant from conduit 38 to pass through the radial flow path 80 and second valve chamber 48 of first valve 42 and flow to the second heat exchanger 28 to heat the transmission fluid flowing therethrough. In the third operating state of system 100, the second valve 82A will remain in its second valve position while the first valve 42 will move from its first valve position to its second valve position, exactly as described above with reference to system 10 and shown in FIG. 4. In the third operating state, the cold coolant from conduit 40 will pass through the second valve chamber 48 of first valve 42 and flow to the second heat exchanger 28 to extract heat from the transmission fluid flowing therethrough. As with the first operating state, the relative volumes of coolant flow to the first and second heat exchangers 26, 28 in the second and third operating states of system 100 may be the same as or similar to those described above in system 10.

Figure 8:
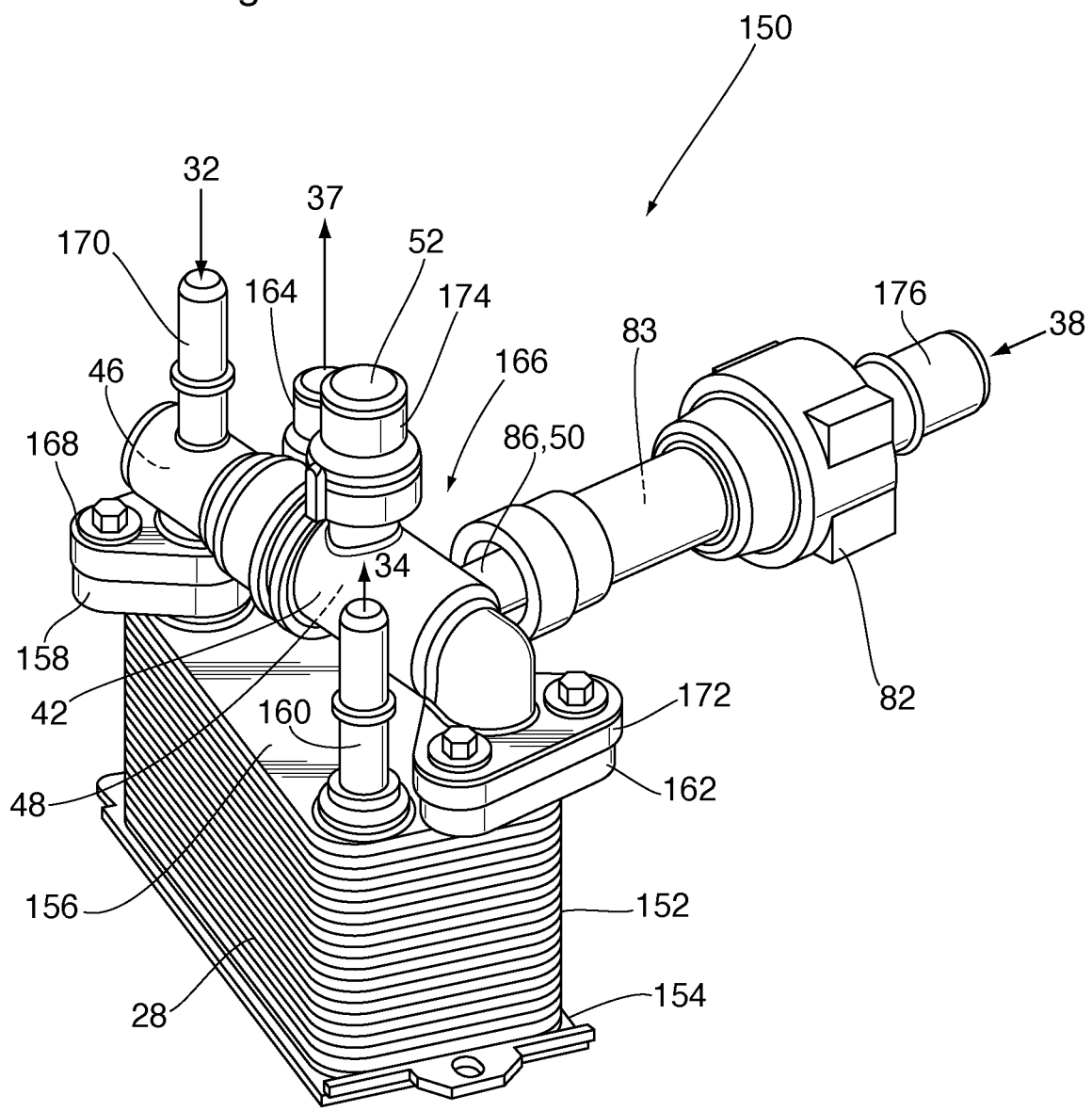
FIG. 8 illustrates a temperature control module incorporating a heat exchanger and a pair of thermally actuated valves.

FIG. 8 illustrates a temperature control module 150 which may be incorporated into heating and cooling system 10 described above. The temperature control module 150 incorporates a heat exchanger and a pair of thermally actuated valves. More specifically, using like reference numerals to identify like elements, module 150 incorporates the second heat exchanger 28, the first valve 42 and the second valve 82.

The second heat exchanger 28 is a transmission fluid heater/cooler in the form of a plate-type heat exchanger comprising a stack of core plates 152 defining alternating flow passages for coolant and transmission fluid in spaces between the plates 152, and having apertures defining manifolds (not shown) extending throughout the height of the plate stack. The heat exchanger 28 includes a bottom plate 154 closing the bottom ends of the manifolds and a top plate 156 having apertures (not shown) in open fluid communication with the manifolds, the apertures being provided with fittings secured to the top plate 156. In the illustrated embodiment, the fittings on top plate 156 comprise: a first valve attachment flange 158 in fluid communication with the transmission fluid inlet manifold; a tubular transmission fluid outlet fitting 160 in fluid communication with a transmission fluid outlet manifold and being adapted for connection to transmission fluid conduit 34; a second valve attachment flange 162 in fluid communication with the coolant inlet manifold; and a tubular coolant outlet fitting 164 in fluid communication with the coolant outlet manifold and being adapted for connection to coolant conduit 37.

The first and second valve attachment flanges 158 and 162 are sealingly secured to a valve assembly 166 incorporating first and second valves 42, 82. The valve assembly 166 includes a first attachment flange 168 located at one end of the valve assembly 166, at which the first valve chamber 46 (i.e. control chamber) of the first valve 42 is located. The first attachment flange 168 is adapted to be sealingly secured to the first valve attachment flange 158 and has an aperture (not shown) which is in fluid communication with the first valve chamber 46 and with the transmission fluid inlet manifold through the first valve attachment flange 158. The valve assembly 166 is further provided with a tubular transmission fluid inlet fitting 170 which is in fluid communication with the interior of the first chamber 46, and which is adapted for connection to transmission fluid conduit 32.

The valve assembly 166 includes a second attachment flange 172 located at another end of the valve assembly 166, at which the second valve chamber 48 of the first valve 42 is located. The second attachment flange 172 is adapted to be sealingly secured to the second valve attachment flange 162 and has an aperture (not shown) which is the outlet port 54 of the second valve chamber 48 and which is in fluid communication with the coolant inlet manifold through the second valve attachment flange 162. The valve assembly 166 is further provided with a tubular coolant inlet fitting 174 which is in fluid communication with the interior of the second valve chamber 48, and which is adapted for connection to (cold) coolant conduit 40. The tubular coolant inlet fitting 174 defines the second inlet port 52 of the second valve chamber 48 of first valve 42.

The valve assembly 166 further comprises second valve 82 which has one end provided with a tubular hot coolant inlet fitting 176 which defines the inlet port 84 of second valve 82, and which is in fluid communication with the valve chamber 83 of valve 82 and coolant conduit 38. The other end of second valve 82 defines the outlet port 86 of valve 82, and is directly connected to the valve 82 through a tubular connection which defines the first inlet port 50 of the second valve chamber 48 of first valve 42. The thermal actuator 87 and valve mechanism 88 of the second valve 82 are not visible in FIG. 8, however, it will be appreciated that they are located inside the valve chamber 83 between the opposite ends of second valve 82. The operation of the temperature control module 150 is in accordance with the operation of system 10, described above.

Although FIG. 8 describes a temperature control module 166 adapted for use in system 10, it will be appreciated that a similar module may be constructed for use in system 100, where the two-port thermal mechanical valve 82 of system 10 is replaced by three-port valve 82A of system 100. The structure of such a module could be similar to the structure of module 166, except that the second valve 82 depicted therein will have a second outlet between its ends for diverting the coolant flow to the first heat exchanger 26.

Figure 9:
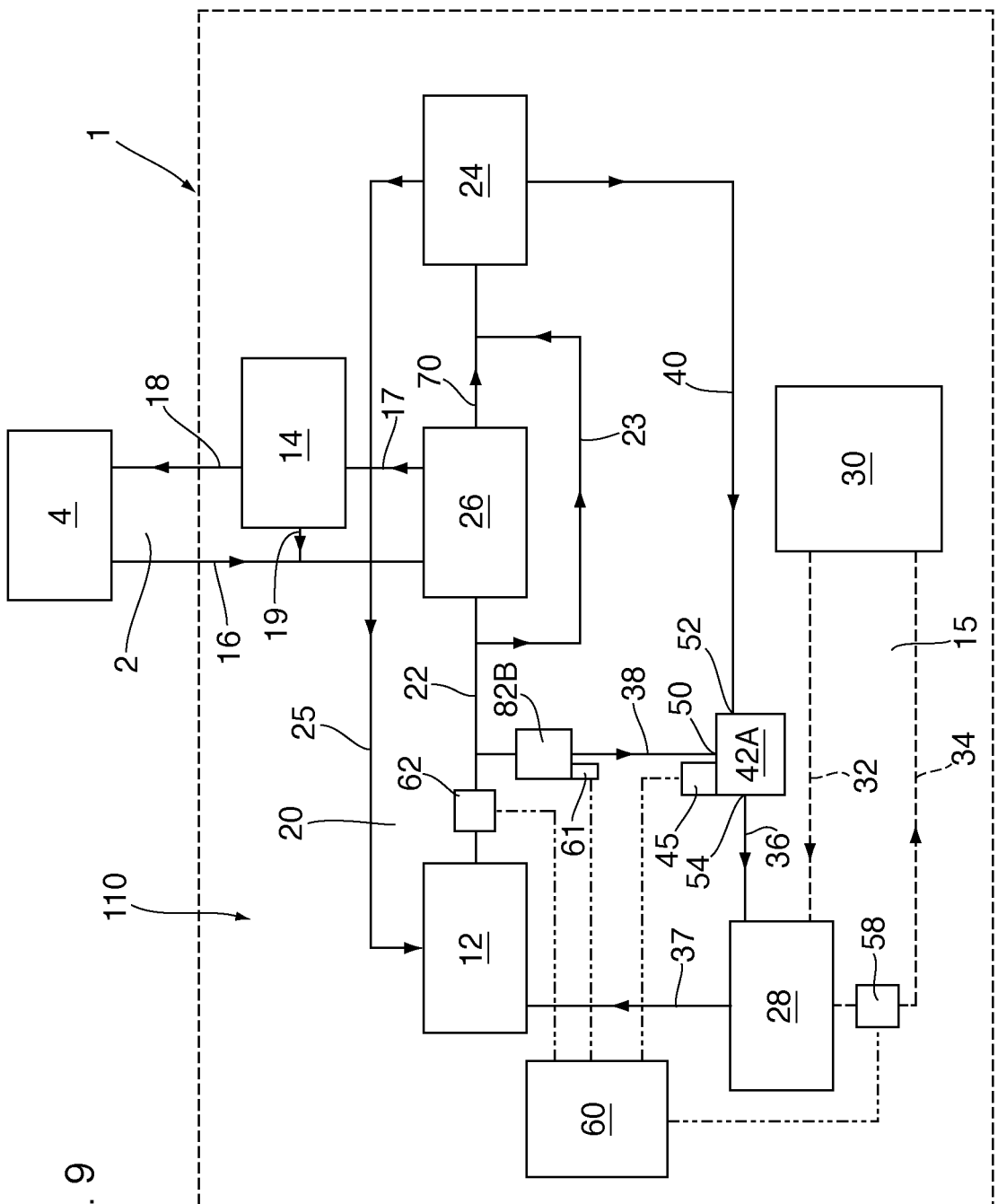
FIG. 9 is a schematic diagram showing a heating/cooling system according to a third embodiment.

While the first valve 42 of systems 10 and 100 comprises a two-fluid thermal mechanical valve, it may instead comprise an electronic valve to achieve similar results. FIG. 9 illustrates a heating/cooling system 110 according to a third embodiment, wherein the thermal mechanical three-port first valve 42 of systems 10 and 100 is replaced by a three-port electronically actuated proportional first valve 42A having an electromechanical actuator 45 such as a solenoid or motor. The valve 42A does not require a control chamber 46 in which the temperature of the transmission fluid is sensed by a thermal actuator 55. Rather, in system 110, the temperature of the transmission fluid within the second fluid circulation loop 15 is monitored by a transmission fluid temperature sensor 58, which transmits a signal to an electronic controller 60, the controller 60 then controlling the actuator 45 which causes displacement of the valve mechanism of valve 42A.

Similar to the first valve 42 of system 10, the first valve 42A is arranged upstream of second heat exchanger 28 and is controllable to select between the hot coolant stream from the first coolant source exiting the engine 12 and flowing through coolant conduit 38, the cold coolant stream from the second coolant source exiting the first heat exchanger 26 and/or the third heat exchanger 24 and flowing through coolant conduit 40, or a combination of the hot and cold streams, depending on the temperature of the transmission fluid sensed by sensor 58. The coolant stream selected by electronically actuated first valve 42A is delivered to second heat exchanger 28 for heat transfer with the transmission fluid flowing through heat exchanger 28.

FIG. 9 also shows that the two-port thermally actuated second valve 82 of system 10 may be replaced by a two-port electronically actuated second valve 82B having an electromechanical actuator 61 such as a solenoid or motor, instead of thermal actuator 87. Second valve 82B has a valve mechanism which is displaced by actuator 61. In system 110, the temperature of the coolant within the first fluid circulation loop 20 is monitored by a coolant temperature sensor 62, which transmits a signal to electronic controller 60, the controller 60 then controlling the actuator 61 which causes displacement of the valve mechanism of valve 82B.

Similarly, the thermally actuated three-port second valve 82A of system 100 may be replaced by a three-port electronically actuated proportional second valve 82 which is adapted to control the output of hot coolant from engine 12 to first heat exchanger 26 and to the first valve 42/second heat exchanger 28. It will be appreciated that it is not necessary that both the first and second valves in system 110 are electrically actuated. Rather, one or both of these valves may be thermally actuated, as in valves 42, 82 and 82A of systems 10 and 100.

In embodiments where the second valves 82 described herein are electronically actuated, as with second valve 82B of FIG. 9, it will be appreciated that the second valve 82 does not necessarily include a leak path 78 or 90 as described above. Rather, depending on the temperature of the coolant sensed by a temperature sensor, such as sensor 62 in FIG. 9, an electronically actuated valve 82 may be opened by a small amount, so as to provide the same volume of coolant flow as leak paths 78 and/or 90. It will be appreciated that any of the thermally actuated second valves 82, 82A described above may be replaced by an electronically actuated valve such as second valve 82B, which may or may not include a leak path 78 and/or 90.

Figure 10:
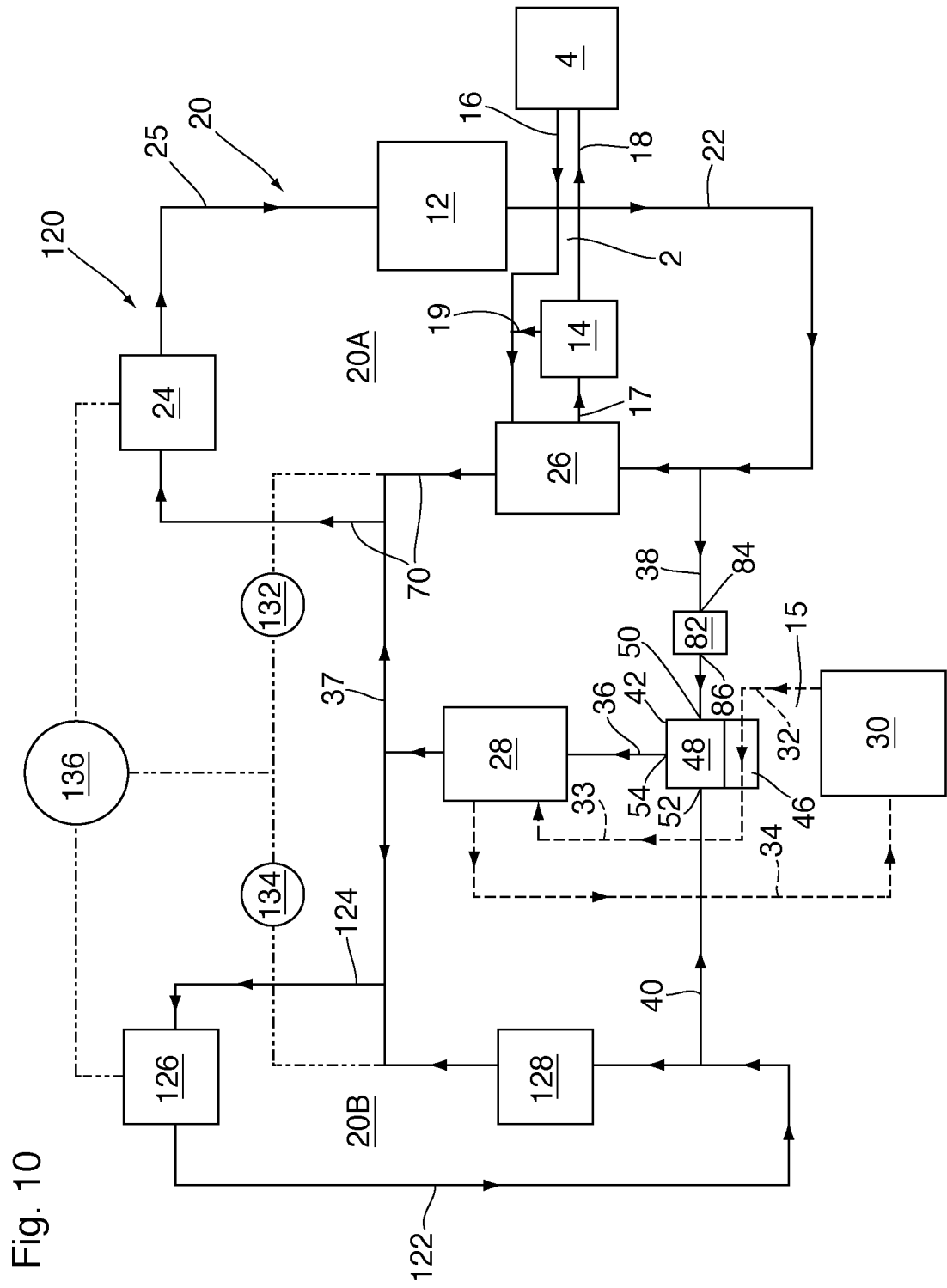
FIG. 10 is a schematic diagram showing a heating/cooling system according to a fourth embodiment.

FIG. 10 illustrates a heating/cooling system 120 according to a fourth embodiment, in which like elements are identified by like reference numerals. System 120 includes a second fluid circulation loop 15 (shown in dotted lines) for circulating transmission fluid, and a first fluid circulation loop 20 includes a high temperature coolant circulation loop 20A and a low temperature coolant circulation loop 20B. The high temperature coolant loop 20A has a similar configuration to the first fluid circulation loop 20 of systems 10, 100 and 110, including a high temperature radiator which may correspond to the third heat exchanger of systems 10, 100 and 110, and is therefore labelled 24. In addition, the high temperature coolant loop 20A includes an internal combustion engine 12 and a first heat exchanger 26 to heat air for the passenger compartment 14.

The low temperature loop 20B circulates coolant at a lower temperature than high temperature loop 20A. Low temperature loop 20B includes a low temperature heat exchanger 126, such as a low temperature radiator, which is optional; and one or more low temperature components 128 to which the coolant in loop 20B is supplied. The coolant in low temperature loop 20B may be the same coolant circulating in the high temperature loop 20A, and flows through a coolant conduit 122 from the low temperature heat exchanger 126 to the low temperature component(s) 128, with the branch point between coolant conduit 122 and coolant conduit 40 being located downstream of the low temperature heat exchanger 126 and upstream of the low temperature component(s) 128, to receive the cooled coolant discharged by heat exchanger 126. Once it is heated by component(s) 128, the coolant returns to the low temperature heat exchanger 126 through coolant conduit 124.

Also shown in FIG. 10 are overflow coolant reservoirs 132, 134 for the respective high and low temperature coolant loops 20A, 20B. As signified by dotted lines in FIG. 10, the overflow coolant reservoirs 132, 134 are in fluid communication with one another and with a main overflow coolant reservoir 136 which is also in fluid communication with the high and low temperature heat exchangers 24, 126.

The system 120 of FIG. 10 also includes a dual mixing valve and a transmission heater/cooler. The dual mixing valve is labeled 42 and may be a thermally or electrically actuated three-port valve which is identical to any of the first valves described above with reference to systems 10, 100 and 110, including first valves 42 and 42A. The transmission heater/cooler is labeled 28 and may be identical to the second heat exchanger 28 described above. As with the first valves 42 and 42A described above, the dual mixing valve 42 of FIG. 10 permits selection between the hot and cold sources of coolant, and the coolant inlet ports 50, 52, coolant conduits 38, 40, coolant outlet port 54 and coolant conduit 36 are labeled in FIG. 10 to show similarities to the systems described above.

As with the embodiments described above, there may be a minor, predetermined amount of coolant flow or "leakage" through the two-port valve 82 in its first, closed position. This ensures that the flow of heated coolant to the high temperature components 122, including first heat exchanger 26, is prioritized over AWU (heating of the transmission fluid), and that the hot coolant will prime the AWU system by providing a limited amount of transmission fluid warming. Also, where the two-port valve 82 is thermally actuated, the leakage will ensure that the thermal actuator of valve 82 will be maintained in contact with the stream of hot coolant from loop 20A.

The coolant discharged by the second heat exchanger 28 may be directed to either the high or low temperature loop 20A or 20B, depending on the temperature of the coolant at the outlet of the heat exchanger 28.

Like systems 10, 100 and 110 described above, the system 120 has three operating states. In a first operating state, corresponding to cold start-up, the first valve 42 and second valve 82 are in their first valve positions, i.e. the first valve 42 has first inlet port 50 open, second inlet port 52 closed, and outlet port 54 open; and the second valve 82 is closed, optionally with a minor amount of leakage through first second valve 82B, which may or may not include a leak path 78 and/or 90 to prime the AWU system. Therefore, in the first operating state, heating and/or defrosting of the passenger compartment 14 is prioritized over active warm-up.

In the second operating state, corresponding to warm-up, the first valve 42 remains in its first valve position and the second valve 82 is in its second valve position, i.e. the second valve 82 is open to permit the flow of coolant from the high temperature loop 20A to enter the first inlet port 50 of first valve 42, pass through radial flow path 80 of valve mechanism 56, exit through the outlet port 54, and flow through the second heat exchanger 28 to heat the transmission fluid in second circulation loop 15. In the second operating state, coolant will continue to flow through the first heat exchanger 26. Therefore the second operating state provides increased active warm-up of the transmission fluid and continued heating and/or defrosting of the passenger compartment 14.

In the third operating state, corresponding to normal operation, the first valve 42 adopts its second valve position and the second valve 82 remains in its second valve position, i.e. the first valve 42 and second valve 82 are in their second valve positions, i.e. the first valve 42 has first inlet port 50 closed, second inlet port 52 open, and outlet port 54 open; and the second valve 82 is open. Therefore, in the third operating state, the closed first inlet port 50 prevents coolant from high temperature loop 20A from flowing through first valve 42 to second heat exchanger 28, while the open second inlet port 52 permits coolant from the low temperature loop 20B to enter the second valve chamber 48 of first valve 42 through open second inlet port 52. The coolant is then discharged from outlet port 54 and flows through the second heat exchanger 28 to cool the transmission fluid in the second circulation loop 15.

Figure 11:
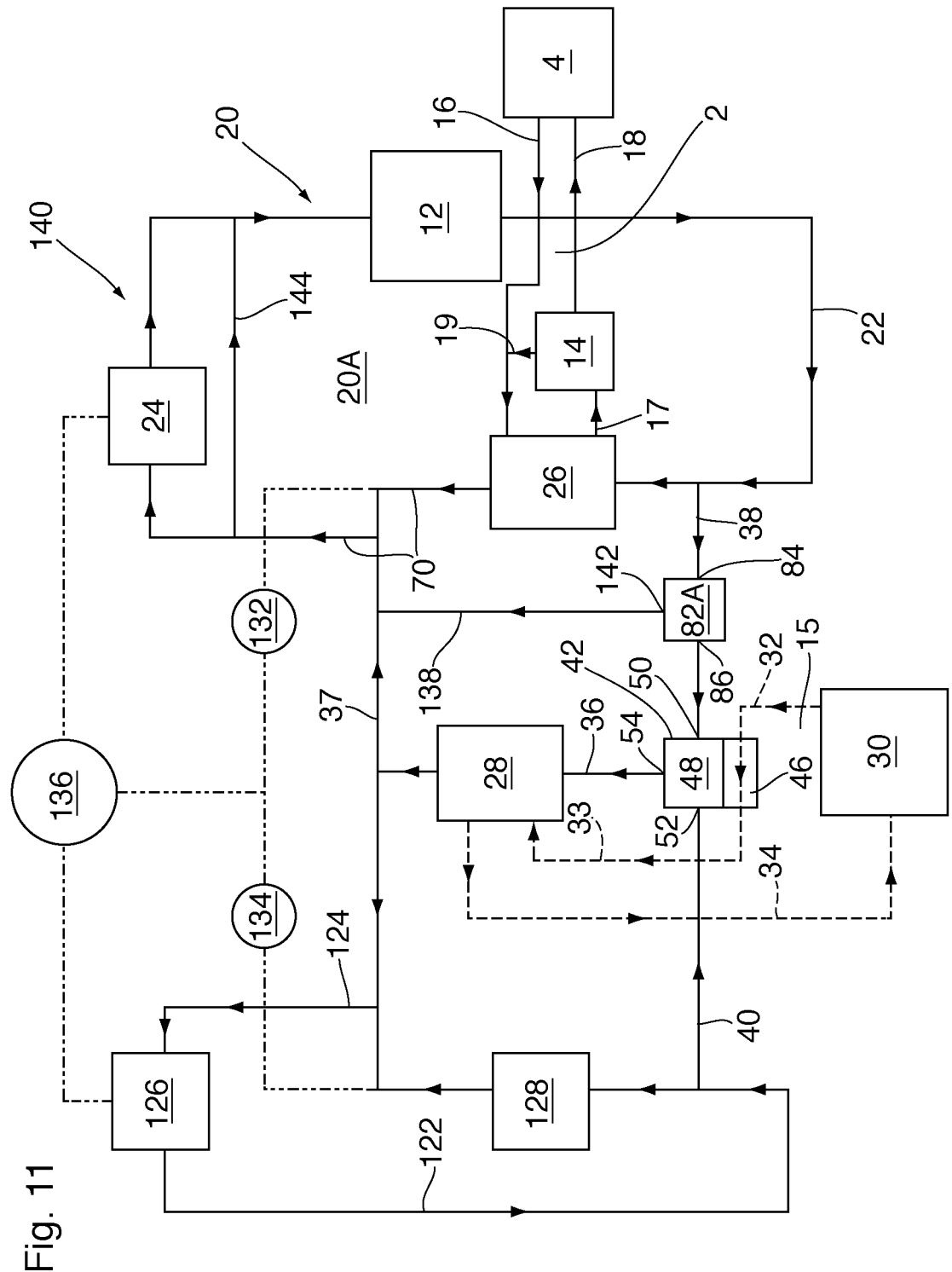
FIG. 11 is a schematic diagram showing a heating/cooling system according to a fifth embodiment.

FIG. 11 illustrates a heating/cooling system 140 according to a fifth embodiment which is similar to the system 120 of FIG. 10, and in which like elements are identified with like reference numerals.

System 140 differs from system 120 in that the two-port valve 82 of FIG. 10 is replaced by a three-port thermally or electrically actuated valve which is similar in structure and function to second valve 82A described above, and/or its electrically actuated counterpart also described above. The second valve 82A has an inlet port 84, a first outlet port 86 and a second outlet port 142. Due to these similarities, the three-port valve is labeled 82A in FIG. 11. The other elements of system 120 are also present in system 140 and a detailed discussion of these elements is therefore omitted.

Like the other systems described above, the system 140 has three operating states. In the first operating state, at cold start-up, the first and second valves 42, 82A are in their first valve positions. The first valve position of the first valve 42 is the same as described above, i.e. with first inlet port 50 open, second inlet port 52 closed and outlet port 54 open. In its first valve position, the three-port valve 82A blocks most or all of the flow of hot coolant from high temperature loop 20A to the dual mixing valve 42, in the manner described above with reference to other systems 10, 100, 110, optionally with a minor portion of leakage flow through second valve 82A. In this operating state, a major portion of the hot coolant flow in coolant conduit 22 flows through the first heat exchanger 26, with the major and minor portions of coolant flow being the same as, or similar to, the minor and major portions of coolant flow described above with reference to the first operating state of system 10, shown in FIG. 2. This prioritizes heating of the passenger compartment 14 by first heat exchanger 26, optionally with a small amount of heating of the transmission fluid in the second circulation loop 15.

As the temperature of the coolant in high temperature loop 20A increases, the system 140 adopts its second operating state during warm-up, with the first valve 42 remaining in its first valve position and three-port second valve 82A adopting its second valve position in which the coolant from high temperature loop 20A is permitted to flow through the second valve 82A from inlet port 84 to first outlet port 86, entering the dual mixing valve 42 and flowing to the heat exchanger 28 to heat the transmission fluid circulating therethrough. In the second operating state, a major portion of the coolant in high temperature loop 20A continues to circulate through the first heat exchanger 26 to provide heating and/or defrosting of the passenger compartment 14, and a minor portion of the coolant in high temperature loop 20A flows through second valve 82A, through first valve 42, and to second heat exchanger 28. In the second operating state of system 140, the major and minor portions of flow may be the same as, or similar to, the major and minor portions of flow in the second operating state of system 10.

As the temperature of the coolant in high temperature loop 20A increases to normal operating temperatures, the system 140 adopts its third operating state, with the first valve 42 adopting its second valve position and the three-port second valve 82A remaining in its second valve position. In its second valve position, the first valve 42 has first inlet port 50 closed, second inlet port 52 open, and outlet port 54 open. Therefore, in the third operating state, the closed first inlet port 50 prevents coolant from high temperature loop 20A from flowing through first valve 42 to second heat exchanger 28, while the open second inlet port 52 permits coolant from the low temperature loop 20B to enter the second valve chamber 48 of first valve 42 through open second inlet port 52. The coolant is then discharged from outlet port 54 and flows through the second heat exchanger 28 to cool the transmission fluid in the second circulation loop 15.

The second outlet port 142 is connected to the first end of a first bypass conduit 138, the second end of which is connected to conduits 37 and/or 70, downstream of the first heat exchanger 26. Therefore, the first bypass conduit 138 permits the flow of coolant from the engine 12 and conduit 22 to bypass the first heat exchanger 26. Such a bypass 138 may be used under extreme cold start conditions, for example of temperatures on the order of −20° C. and below. Under extreme cold start conditions, the use of first bypass conduit 138 allows engine heating to be prioritized immediately after the engine is started. Thus, system 140 effectively has a fourth operating state under extreme cold start conditions. In this operating state, a flow path from inlet port 84 to second outlet port 142 is completely open to permit a major portion of the coolant in conduit 22 to enter conduit 38 and flow through second valve 82A. The flow path from inlet port 84 through outlet port 86 may either comprise a leak path as in the first operating state, or it may be completely closed such that no coolant reaches the second heat exchanger 28 in the fourth operating state.

The fourth operating state will remain in effect for a predetermined period of time to permit some warming of the engine 12 to occur, typically less than about 30 seconds. During the fourth operating state, the volume of coolant flow through the first bypass conduit 138 will be on the order of about 90% by volume of the total coolant flow from engine 12 through coolant conduit 22. The control of the flow path from inlet port 84 to second outlet port 142 may be electronically controlled, for example in response to a temperature sensor (not shown) located in coolant conduit 22. Also, as shown in FIG. 11, there may be a second bypass conduit 144 to optionally bypass the third heat exchanger 24, for example during the fourth operating state. Once sufficient engine heating has taken place, the second valve 82A will close the first bypass conduit 138 and the system 140 will adopt the first operating state. Optionally, flow through the first bypass conduit 138 may resume under other operating conditions, for example during operating conditions where heating of air by first heat exchanger 26 is not required.

Although not shown in FIGS. 10 and 11, it will be appreciated that the high temperature coolant circulation loop 20A of systems 120, 140 may include a bypass passage 23 similar to that described above, controlled by a bypass valve, through which the coolant circulating in the high temperature loop 20A may bypass the first heat exchanger 26 and flow directly to the heat exchanger 24.

While various valve system configurations have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heating and cooling system for a vehicle having an internal combustion engine, a powertrain component and a passenger compartment, the system comprising:
   (a) a first fluid circulation loop for circulating an engine coolant, wherein the first fluid circulation loop includes said engine;
   (b) a second fluid circulation loop for circulating an automotive fluid for lubricating said powertrain component, wherein the second fluid circulation loop includes said powertrain component;
   (c) a first heat exchanger located downstream of the engine in said engine coolant circulation loop, the first heat exchanger being adapted to receive the engine coolant discharged by the engine and transfer heat from the engine coolant to an air stream provided to the passenger compartment;
   (d) a second heat exchanger fluidly connected to both the engine coolant circulation loop and the automotive fluid circulation loop and adapted for transferring heat between the engine coolant and the automotive fluid;
   (e) a first valve provided in the engine coolant circulation loop, the first valve having a first inlet port for receiving said engine coolant from a first coolant source in said engine coolant circulation loop; a second inlet port for receiving said engine coolant from a second coolant source in said engine coolant circulation loop; and an outlet port for discharging said engine coolant to the second heat exchanger;
   wherein the first valve has a first valve position in which a flow path through the first inlet port and the outlet port is open, and a second valve position in which a flow path through the second inlet port and the outlet port is open;
   (f) a second valve provided in the engine coolant circulation loop, the second valve having an inlet port for receiving said engine coolant from the first coolant source, and a first outlet port for discharging said engine coolant to the first inlet port of the first valve;
   wherein the second valve has a first valve position in which a flow path through the inlet port and the first outlet port is partly or completely closed, and a second valve position in which the flow path through the inlet port and the first outlet port is open;

wherein the first coolant source is located intermediate a coolant outlet of the engine through which the engine coolant is discharged, and an inlet of the first heat exchanger;

wherein the second valve is a three-port valve wherein said outlet port comprises a first outlet port and said flow path through the inlet port and the first outlet port is the first flow path;

the second valve further comprising a second outlet port, and a second flow path through the inlet port and the second outlet port;

wherein, in a first operating state wherein the first and second valves are in their first valve positions, the first flow path is partly or completely closed, and the second flow path is open.

2. The heating and cooling system of claim 1, wherein the second coolant source is located downstream of a coolant outlet of the first heat exchanger.

3. The heating and cooling system of claim 1, wherein the engine coolant from the first coolant source is at a higher temperature than the engine coolant from the second coolant source.

4. The heating and cooling system of claim 1, wherein the first valve is actuated from its first valve position to its second valve position in response to a temperature increase of the automotive fluid.

5. The heating and cooling system of claim 1, wherein the second valve is actuated from its first valve position to its second valve position in response to a temperature increase of the engine coolant discharged by the engine and received from the first coolant source.

6. The heating and cooling system of claim 1, wherein the second valve permits a small, predetermined amount of leakage of engine coolant therethrough in the first valve position.

7. The heating and cooling system of claim 1, further comprising a third heat exchanger located downstream of the first heat exchanger in said engine coolant circulation loop, the third heat exchanger being adapted to receive the engine coolant discharged by the first heat exchanger, and wherein the second coolant source is located downstream of a coolant outlet of the third heat exchanger.

8. The heating and cooling system of claim 7, wherein the third heat exchanger is a radiator.

9. The heating and cooling system of claim 1, wherein, in the first operating state at initial cold start-up of the engine, both the first valve and the second valve are in their first valve positions, such that a first major portion of the engine coolant from the first coolant source is directed toward the first heat exchanger, and a first minor portion of the engine coolant from the first coolant source flows through a leak path of the second valve, through the open first inlet port and the outlet port of the first valve, to transfer heat to the automotive fluid flowing through the second heat exchanger.

10. The heating and cooling system of claim 9, having a second operating state during warm-up of the engine, after initial cold start-up, wherein the first valve is in its first valve position and the second valve is in its second valve position, such that a second major portion of the engine coolant from the first coolant source is directed toward the first heat exchanger, and a second minor portion of the engine coolant from the first coolant source flows through the second valve, through the open first inlet port and the outlet port of the first valve, to transfer heat to the automotive fluid flowing through the second heat exchanger, wherein the first major portion is greater than the second major portion, and the first minor portion is less than the second minor portion.

11. The heating and cooling system of claim 10, having a third operating state during normal operation of the engine, after warm-up, wherein both the first valve and the second valve are in their second valve positions, such that substantially none of the engine coolant from the first coolant source enters the first valve through the first inlet port, and such that the engine coolant from the second coolant source flows through the first valve, through the open second inlet port and the outlet port, to extract heat from the automotive fluid flowing through the second heat exchanger.

12. The heating and cooling system of claim 11, the engine coolant circulation loop further comprising a bypass passage for bypassing the first heat exchanger, the bypass passage having an inlet located between the engine and the first heat exchanger and an outlet downstream of the first heat exchanger.

13. The heating and cooling system of claim 12, wherein the inlet of the bypass passage is located downstream of the first coolant source such that some or all of the engine coolant directed to the first heat exchanger in at least the second and third operating states may bypass the first heat exchanger, depending on the temperature of the coolant at the first coolant source and/or heating requirements in the passenger compartment.

14. The heating and cooling system of claim 1, wherein the first fluid circulation loop comprises a high temperature coolant circulation loop and a low temperature circulation loop;

wherein the engine and the first heat exchanger are provided in the high temperature coolant circulation loop;

wherein the low temperature circulation loop includes a low temperature circulation loop in which a low temperature heat exchanger and one of more low temperature components are provided; and wherein the second coolant source is located in the low temperature circulation loop, downstream of the low temperature heat exchanger and upstream of the one of more low temperature components.

15. The heating and cooling system of claim 11, wherein the second outlet port of the second heat exchanger is connected to a first end of a first bypass conduit which bypasses the first heat exchanger;

the system having a fourth operating state to prioritize heating of the engine under extreme cold start conditions;

wherein, in the fourth operating state, the second flow path from the inlet port of the second valve to the second outlet port of the second valve is completely open to permit a major portion of the coolant to flow through the first bypass conduit.

16. The heating and cooling system of claim 15, further comprising a second bypass conduit which bypasses the third heat exchanger.

17. The heating and cooling system of claim 1, wherein the powertrain component is a transmission and the automotive fluid is transmission fluid.

18. A method of heating and/or cooling an automotive fluid in a vehicle using the heating and cooling system according to claim 11, comprising:

(a) in the first operating state of the system with both the first and second valves in their first positions, starting the engine of the vehicle under cold start conditions and circulating the engine coolant through the engine coolant circulation loop, and circulating the automotive fluid through the automotive fluid circulation loop, such that most or all of the engine coolant from the first coolant source flows through the first heat exchanger and transfers heat to said air stream provided to the passenger compartment;

(b) as the temperature of the engine coolant discharged by the engine increases, transitioning the second valve from its first valve position to its second valve position and transitioning the system from the first operating state to the second operating state;

(c) in the second operating state of the system with the first valve in its first operating position and the second valve in its second operating position, operating the engine under warm-up conditions and circulating the engine coolant through the engine coolant circulation loop, and circulating the automotive fluid through the automotive fluid circulation loop, such that the engine coolant from the first coolant source continues to flow through the first heat exchanger and transfers heat to said air stream provided to the passenger compartment and/or bypasses the first heat exchanger, and such that the engine coolant from the first coolant source flows through the second valve to the first valve, and through the first valve to the second heat exchanger, and transfers heat to the automotive fluid flowing through the second heat exchanger; and (d) as the temperature of the engine coolant discharged by the engine increases to within a normal operating range, transitioning the first valve from its first valve position to its second valve position and transitioning the system from the second operating state to the third operating state;

(e) in the third operating state of the system with both the first and second valves in their second operating positions, operating the engine under normal operating conditions and circulating the engine coolant through the engine coolant circulation loop, and circulating the automotive fluid through the automotive fluid circulation loop, such that the engine coolant from the second coolant source flows through the first valve to the second heat exchanger, and extracts heat from the automotive fluid flowing through the second heat exchanger, and such that the such that the engine coolant from the first coolant source continues to flow through the first heat exchanger and transfers heat to said air stream provided to the passenger compartment, and/or bypasses the first heat exchanger.

\* \* \* \* \*